(12) United States Patent
Takayama et al.

(10) Patent No.: US 7,648,773 B2
(45) Date of Patent: Jan. 19, 2010

(54) THERMAL SPRAY MEMBRANE CONTACT MATERIAL, CONTACT MEMBER AND CONTACT PART, AND APPARATUSES TO WHICH THEY ARE APPLIED

(75) Inventors: Takemori Takayama, Hirakata (JP); Tetsuo Ohnishi, Yawata (JP); Kazuo Okamura, Kameoka (JP)

(73) Assignee: Komatsu Ltd., Tokyo (JP)

( * ) Notice: Subject to any disclaimer, the term of this patent is extended or adjusted under 35 U.S.C. 154(b) by 113 days.

(21) Appl. No.: 11/824,925

(22) Filed: Jul. 2, 2007

(65) Prior Publication Data

US 2007/0298980 A1 Dec. 27, 2007

Related U.S. Application Data

(62) Division of application No. 10/848,704, filed on May 18, 2004, now Pat. No. 7,438,979.

(30) Foreign Application Priority Data

May 26, 2003 (JP) .............................. 2003-148101

(51) Int. Cl.
*B32B 15/02* (2006.01)
*B32B 15/16* (2006.01)
*B22F 3/115* (2006.01)
*F16C 25/02* (2006.01)
*F16C 17/00* (2006.01)

(52) U.S. Cl. ........................ 428/569; 428/613; 428/937; 506/100; 506/103; 384/322; 384/368; 384/416; 384/420

(58) Field of Classification Search ....................... None
See application file for complete search history.

(56) References Cited

U.S. PATENT DOCUMENTS 4,334,235 A 6/1982 Nishisawa (Continued)

FOREIGN PATENT DOCUMENTS

CN 1113662 A 12/1995

(Continued)

OTHER PUBLICATIONS

P/M Parts—Their Design and Manufacture; Edited by Japan Powder Metallurgy Association; Issued by Gijutsushoin Co., Ltd., Oct. 20, 1977, pp. 327-341.

(Continued)

*Primary Examiner*—Jennifer McNeil
*Assistant Examiner*—Jason L Savage
(74) *Attorney, Agent, or Firm*—Frishauf, Holtz, Goodman & Chick, P.C.

(57) ABSTRACT

To provide a thermal spray membrane contact material, contact member and contact part and an apparatus to which they are applied, showing excellent seizure resistance and wear resistance even under high surface pressure/low speed sliding, high speed/high temperature sliding, or high surface pressure/high speed sliding. In a bucket connecting apparatus connecting an arm and a bucket by a work implement connecting pin, the above-mentioned work implement connecting pin comprises a base material made of steel having an axis function and a contact surface formed of a thermal spray membrane contact material film-formed on the base material, said contact surface being placed at least on a supported surface site of the work implement connecting pin relative to a bracket and on a slipping contact surface with a work implement bushing, further, said thermal spray membrane contact material being composed of a Mo metal phase, or 10 vol % or more of a Mo metal phase and a metal phase and/or alloy phase containing one or more elements selected from the group consisting of Fe, Ni, Co, Cr, Cu and Zn.

9 Claims, 23 Drawing Sheets

U.S. PATENT DOCUMENTS

| | | | |
|---|---|---|---|
| 4,597,939 | A | 7/1986 | Neuhauser et al. |
| 4,822,415 | A | 4/1989 | Dorfman et al. |
| 5,249,661 | A | 10/1993 | Kawamura et al. |
| 5,334,235 | A * | 8/1994 | Dorfman et al. ............. 75/255 |
| 5,555,859 | A | 9/1996 | Melchior et al. |
| 6,001,494 | A | 12/1999 | Kuchinski et al. |
| 6,126,414 | A | 10/2000 | Koike |
| 6,254,699 | B1 | 7/2001 | Hermanek |
| 6,962,458 | B2 | 11/2005 | Takayama et al. |
| 7,078,107 | B2 | 7/2006 | Takayama et al. |
| 2002/0172836 | A1 | 11/2002 | Takayama et al. |
| 2003/0150140 | A1 | 8/2003 | Takayama et al. |

FOREIGN PATENT DOCUMENTS

| | | | |
|---|---|---|---|
| CN | 1201105 A | 12/1998 | |
| CN | 1 408 963 A | 4/2003 | |
| DE | 32 47 054 C1 | 5/1984 | |
| EP | 0 769 568 A1 | 4/1997 | |
| EP | 1 036 855 A1 | 9/2000 | |
| EP | 1375695 A1 | 1/2004 | |
| JP | A-50-073834 | 6/1975 | |
| JP | 56-044070 A | 4/1981 | |
| JP | A-58-001066 | 1/1983 | |
| JP | 58-64523 A | 4/1983 | |
| JP | 58-153560 A | 9/1983 | |
| JP | 61-064865 A | 4/1986 | |
| JP | 61-064866 A | 4/1986 | |
| JP | 61-076657 A | 4/1986 | |
| JP | 61-153270 A | 7/1986 | |
| JP | 62-133027 | 6/1987 | |
| JP | A-63-167123 | 7/1988 | |
| JP | 2-45158 U | 3/1990 | |
| JP | 2-225653 A | 9/1990 | |
| JP | 2-305951 A | 12/1990 | |
| JP | 3-013555 A | 1/1991 | |
| JP | 3-087347 A | 4/1991 | |
| JP | 3-126855 A | 5/1991 | |
| JP | 03-215642 | 9/1991 | |
| JP | 3-277764 A | 12/1991 | |
| JP | 5001723 A | 1/1993 | |
| JP | A-05-106009 | 4/1993 | |
| JP | 5-36486 B2 | 5/1993 | |
| JP | 5-214468 A | 8/1993 | |
| JP | 6-6725 B2 | 1/1994 | |
| JP | 7-166278 A | 6/1995 | |
| JP | 08-105444 | 4/1996 | |
| JP | 8-109450 A | 4/1996 | |
| JP | A-09-152034 | 6/1997 | |
| JP | A-09 235662 | 9/1997 | |
| JP | 10-246230 A | 9/1998 | |
| JP | 2832800 B2 | 10/1998 | |
| JP | A-2001-152307 | 6/2001 | |
| JP | A-2001-172756 | 6/2001 | |
| JP | 2001-271129 A | 10/2001 | |
| JP | A-2002-003962 | 1/2002 | |
| JP | A-2002-088462 | 3/2002 | |
| JP | A-2002-106301 | 4/2002 | |
| JP | 2002-180216 A | 6/2002 | |
| JP | 2002-266587 A | 9/2002 | |
| WO | WO 02/068706 A1 | 9/2002 | |

OTHER PUBLICATIONS

Engineering Data Book for Copper Based Alloy Casting; Edited by Japan Non-Ferrous Metal Casting Association, Issued by Materials Process Technology Center (Sokeizai Center)1 Jul. 30, 1998, pp. 134-155.

* cited by examiner 1 (a)

Contact Surface

Pb-lack layer 22 (a)

Structure Image 22 (b)

Pb Distribution 22 (c)

Fe Distribution

PRIOR ART    FIG. 23
23 (a)
Structure Image
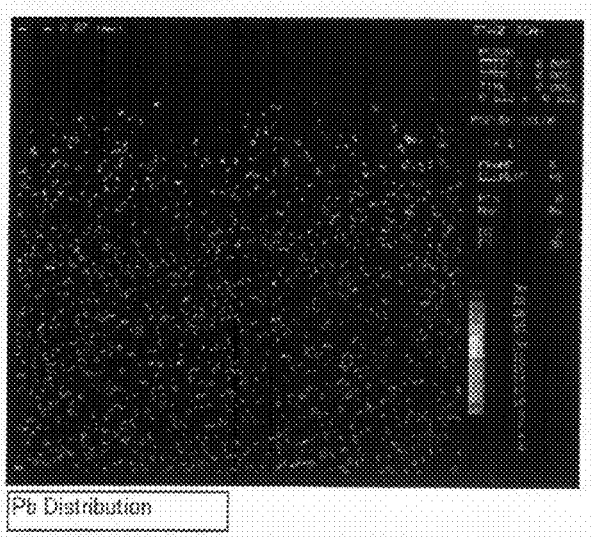
23 (b)
Pb Distribution
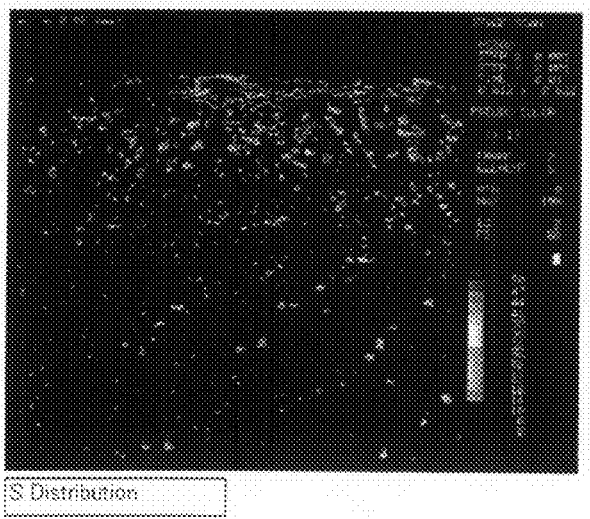
23 (c)
S Distribution

THERMAL SPRAY MEMBRANE CONTACT MATERIAL, CONTACT MEMBER AND CONTACT PART, AND APPARATUSES TO WHICH THEY ARE APPLIED

CROSS-REFERENCE TO RELATED APPLICATIONS

This application is a divisional application of application Ser. No. 10/848,704 filed May 18, 2004 (U.S. Pat. No. 7,438,979), which is hereby incorporated in its entirety herein by this reference.

TECHNICAL FIELD

The present invention relates to a thermal spray membrane contact material, contact member and contact part, and an apparatus to which they are applied, intending improvement in seizure resistance and wear resistance, and the like under severe sliding conditions such as high surface pressure/low speed sliding, high speed/high temperature sliding, high surface pressure/high speed sliding, and the like.

BACKGROUND ART

Conventionally, as bearings usable with a long period of greasing interval or without greasing, oil-containing slip bearings prepared by allowing pores in a Cu-based or Fe-based porous sintered alloy to contain a lubricating oil are widely put into practical use. Selection of the Cu-based or Fe-based porous sintered alloy is determined depending on conditions such as oil lubricating state, sliding speed, contact surface-pressure and the like, and under light-load and high-speed sliding conditions, a bronze-based oil-containing slip bearing is suitably utilized, whereas under high-surface-pressure and low-speed sliding conditions, a Fe—C, Fe—Cu or Fe—C—Cu-based oil-containing slip bearing is suitably utilized (see, for example, Japan Powder Metallurgy Association ed. Parts—Their design and manufacture", Gijutsu Shoin Co., Ltd., Oct. 20, 1987, p. 327-341). On one hand, there are widely utilized also slip bearings produced by orderly arranging graphite fragments as a solid lubricant on a bearing material made of high tensile brass and bronze, and allowing the graphite fragments to contain a lubricating oil (for example, 500 SP manufactured by Oiles Corp.). On the other hand, prior technologies aiming at improvement in a sliding property under high surface pressure and low speed sliding are shown in the following various patent literatures.

Japanese Patent No. 2832800 adopts a composite sintered alloy having a porosity of 5 to 30 vol % and composed of a copper powder and an iron powder, as an iron-based sintered body in a slip bearing in which a lubricating oil having a kinematic viscosity of 240 cSt to 1500 cSt is impregnated on an iron-based sintered body oil-containing bearing used under sliding conditions of a high surface pressure of 600 kgf/cm² or more and a sliding speed of 1.2 to 3 m/min, and discloses that it is preferable to perform a carburizing, nitriding or sulfurizing nitriding treatment on a contact surface.

Japanese Patent Application Laid-Open (JP-A) No. 10-246230 discloses that a slip bearing produced by filling a lubricant composition containing a solid lubricant or an extreme-pressure additive having a dropping point of 60° C. or more in semi-solid condition or solid condition at ambient temperature, into pores in an iron-based sintered alloy containing martensite in an iron-carbon alloy base and in which at least one of copper particles and copper alloy particles are dispersed, shows excellent slip bearing performance under a surface pressure of 30 MPa or more.

Japanese Patent Publication (JP-B) No. 6-6725 discloses that a sintered copper alloy having self lubricity suitable for use on a ware plate of a press machine and the like is obtained by sintering under pressure a mixed powder prepared by mixing a copper alloy powder containing 5 to 30 wt % of Ni, 7 to 13 wt % of Sn and 0.3 to 2 wt % of P with 1 to 5 wt % of Mo and 1 to 2.5 wt % of a graphite powder.

JP-A No. 8-109450 discloses a wear resistant sintered alloy for oil-containing bearing characterized in that Cu particles or Cu alloy particles are dispersed in an iron-carbon alloy base having martensite present therein, the content of Cu is from 7 to 30 wt % and, alloy particles having a specific composition as a phase harder than the above-mentioned iron-carbon alloy base are dispersed in an amount of 5 to 30 wt % and the porosity is from 8 to 30 vol %. In this wear resistant sintered alloy for oil-containing bearing, by dispersing a large amount of soft Cu particles in a martensite phase, conformability is improved, and by dispersing alloy particles harder than the martensite of the base, plastic deformation of the base is decreased and load applied on the base alloy in sliding contact state is lowered, to obtain excellent wear resistance even under high surface pressure. Here, this patent literature mentions, as the above-mentioned alloy particles, ① Fe-base alloy particles (high speed steel (Highss) powder particles) containing 0.6 to 1.7 wt % of C, 3 to 5 wt % of Cr, 1 to 20 wt % of W and 0.5 to 6 wt % of V, ② Fe-base alloy particles (high speed steel (Highss containing Mo, Co) powder particles) containing 0.6 to 1.7 wt % of C, 3 to 5 wt % of Cr, 1 to 20 wt % of W, 0.5 to 6 wt % of V and 20 wt % or less of Mo and/or Co, ③ Mo—Fe particles (ferro-molybdenum) containing 55 to 70 wt % of Mo, ④ Co-base alloy particles (heat resistant and wear resistant alloy powder for build up spraying, trade name: COBAMET manufactured by Cabot) containing 5 to 15 wt % of Cr, 20 to 40 wt % of Mo and 1 to 5 wt % of Si; and the like.

JP-A No. 2001-271129 which is a prior application of the applicant discloses a slip bearing characterized in that hard dispersion materials such as various intermetallic compounds and the like, solid lubricants such as graphite and the like may be contained in an (alpha+beta) two-phase structure having at least a beta phase dispersed in the structure, or a beta phase structure constituting a Cu—Al—Sn-based sintered contact material, and in which, further, the Cu—Al—Sn-based sintered contact material is integrated on the inner circumferential surface of an iron-based backing metal, so as to maintain bearing rigidity and press fit force in press-fitting on a work implement connecting apparatus. In this slip bearing, the above-mentioned Cu—Al—Sn-based sintered contact material is soft as compared with the bearing material containing martensite according to the above-mentioned patent literature 4, and excellent in conformability with a contact opposite member (work implement connecting pin or the like). Therefore, this sliding bearing is an extremely excellent sliding bearing which can be suitably used at extremely low sliding speed (0.6 m/min or less) and a high surface pressure of up to 1200 kgf/cm².

JP-A No. 7-166278 discloses that a sintered contact material having an excellent lubricating ability, affinity to oil, low friction coefficient and high wear resistance can be obtained by adding 0.5 to 5 wt % of Mo or 0.5 to 15 wt % of Fe—Mo into a bronze-based and/or lead bronze-based sintered contact material containing 4 to 12 wt % of Sn or this and 0.1 to 10 wt % of Pb.

On one hand, comparatively soft lead bronze ingot materials (for example, LBC 2 to 5) are often used as, for example, a contact material for floating bushing of a turbo charger used under high speed, high temperature and oil lubrication conditions, however, from the standpoint of corrosion resistance under high temperature sliding condition (sulfur attack property), free-cutting brass-based and high tensile brass-based alloys containing Pb are suitably used (see, for example, JP-B No. 5-36486). Additionally, Al bronze-based ingot materials are also investigated as the contact material for floating bushing (see, for example, JP-A No. 5-214468).

On the other hand, in the case of, for example, engine metals used under high surface pressure and high speed sliding conditions, an overlay layer made of a soft metal such as Sn and the like is formed on a contact surface of a lead bronze-based sintered bushing to improve conformability and to obtain improved fluid lubricity.

Further, in parts sliding under high surface pressure and high speed conditions (hereinafter, referred to as "sliding part") of constituent parts of hydraulic pumps/motors used under high surface pressure and high speed sliding conditions likewise, a material containing lead bronze integrated by a cast wrapping method and the like is used as a constituent material, and in sliding parts used under particularly severe sliding conditions, materials having high strength, and excellent seizure resistance and wear resistance such as high tensile brass are used as a constituent material (see, for example, Japan Non-ferrous Metal Casting Association ed., "ENGINEERING DATA BOOK FOR COPPER BASED ALLOY CASTING", Issued by Materials Process Technology Center (SOKEIZAI CENTER), Jul. 30, 1988, p. 134-155).

In general, it is extremely rare to attain fluid lubricating condition on an oil-containing slip bearing, and particularly under extremely low sliding speed and high surface pressure conditions, the film thickness of a lubricant oil on a bearing surface (contact surface) becomes, due to escape of oil pressure through pores in a sintered material, approximately the surface roughness of the bearing surface or smaller, and in many cases, boundary lubricating sliding conditions including solid friction (adhesion) are provided. Consequently, in slip bearings (bushing, thrust bearings and the like) used under sliding conditions of a surface pressure of 300 kgf/cm² or more and a sliding speed of 0.01 to 2 m/min, in a work implement connecting portion of construction machines such as, for example, a hydraulic excavator and the like, its seizure resistance and Wear resistance are significantly ruled by material functions of the sliding bearing (composition and structure).

However, the Cu-based and Fe-based porous sintered alloy material according the above-mentioned literature (Japan Powder Metallurgy Association ed. "P/M Parts—Their design and manufacture", Gijutsu Shoin Co., Ltd., Oct. 20, 1987, p. 327-341) has a problem that it cannot be adapted to extremely low sliding speed and high surface pressure conditions of a sliding speed of 0.01 to 2 m/min and a surface pressure of 300 kgf/cm² or more, as apparent from FIG. 21 showing the application range of an oil-containing slip bearing generally used (Japan Powder Metallurgy Association ed. "P/M Parts—Their design and manufacture", Gijutsu Shoin Co., Ltd., Oct. 20, 1987, p. 337, FIG. 6. 19 "Sintered bearing application example", is cited).

Even a composite sintered alloy material according to Japanese Patent No. 2832800 in which surface treatments such as carburization, nitriding and the like are performed on a composite sintered alloy composed of a copper powder and an iron powder, and an iron-base sintered alloy material according to JP-A No. 10-246230 in which pores are filled with extreme-pressure additives and the like and a martensite structure is contained have a problem that there is a possibility that a sufficient sliding ability is not manifested under extremely low sliding speed (0.01 to 2 m/min), too.

In the sintered copper alloy material according to JP-B No. 6-6725 having self lubricity suitable for use on a ware plate or the like of a press machine, local metal contact with an opposite member tends to occur under sliding conditions in which a lubricating oil film is not easily formed due to extremely low sliding speed and high surface pressure, resultantly there is a problem that sufficient seizure resistance and wear resistance are not obtained easily. Further, there is also a problem that when the addition amount of soft solid lubricants such as graphite, $MoS_2$ and the like dispersed in the sintered copper alloy material is over 2.5 wt %, its strength decreases remarkably.

In the above-mentioned wear resistant sintered alloy for oil-containing bearing according to JP-A No. 8-109450, the plastic deformation of a base is reduced and load applied on a base alloy in sliding contact state is decreased by dispersing a large amount of soft Cu particles in a martensite phase and dispersing alloy particles harder than the martensite in a base, however, it has a problem that an effect of improving adhesion resistance is not sufficient since co-existence of dispersion of soft Cu particles and dispersion (5 to 30 wt %) of hard alloy particles in one alloy is limited and load applied on the base alloy in sliding contact state is concentrated on its hard alloy particles. Further, there is also a problem that by addition of a large amount of alloy particles harder than a martensite in a base and having no self lubricity, a contact opposite material is remarkably attacked by adhesion wearing, and the temperature of a contact surface increases to easily cause a seizure phenomenon. Furthermore, there is a problem that a bearing bushing made of this wear resistant sintered alloy for oil-containing bearing as a constituent material is expensive. There is also an investigation of lowering cost, increasing a sliding ability, improving maintenance and the like by sharing the role of a sliding function to a cheap contact material constituting mutual slip pair, however, a solution is not attained yet.

The Cu—Al—Sn-based sintered contact material suggested in JP-A No. 2001-271129 which is a prior application of the applicant is an extremely excellent bearing material which can be used at extremely low sliding speed (0.6 m/min or less) and a high surface pressure of up to 1200 kgf/cm², which cannot be attained by conventional bearing materials of iron-carbon alloy base, however, it has a problem that, due to somewhat lack in pressure resistance required in use environments in which earth and sand invade, wearing progresses easily under such use environments.

The sintered contact material according to JP-A NO. 7-1662778 has, when a lubricating function formed by Mo of 5% by area or less or Fe-55 to 70 wt % Mo (ferro-molybdenum phase) of 15% by area or less based on the contact area using a bronze alloy phase as a mother phase is singly performed, problems that, under extreme low sliding speed and high surface pressure conditions such as for the above-mentioned work implement connecting portion, formation of an adhesion portion by local metal contact with an opposite member is not sufficiently prevented and adhesion wearing progresses, and conformability resistance, seizure resistance and wear resistance are not sufficiently attained, and hard MoFe (ferro-molybdenum) particles remarkably attack a contact opposite material. It is easily envisaged to be able to improve a sliding property by regulating the addition amount of Mo at 5 wt % or more, however, there occurs, in this case, a new problem that the structure strength of the sintered contact material is decreased.

The high tensile brass-based and Al bronze-based contact materials containing a lead bronze-based material and lead according to JP-B No. 5-36486 and JP-A No. 5-214468 suitably used as a constituent material of a floating bushing in a turbo charger are recently required to improve seizure resistance and wear resistance under higher speed and higher temperature sliding and to manifest excellent seizure resistance, wear resistance and corrosion resistance even under poor lubrication condition in starting of a turbo charger and the like, however, these contact materials have a problem that (1) a Pb-lack layer after elution of Pb is formed near a contact surface (see, FIG. 22 (a) to (c)), and (2) even after stop of operation of a turbo charger, the temperature at a bearing portion increases to high temperatures around 300° C. due to heat conduction from a turbine and consequently a layer of accumulation of CuS and sludge formed by reaction with S in a lubricating oil is formed on a trace of Pb connecting to the contact surface (see, FIG. 23 (a) to (b)), therefore, a lubricating ability by Pb decreases, and essential improvement against seizure resistance and durability (elongation of life) is impossible. Further, from the standpoint of recent environmental problems, there is a problem that a large amount of Pb contained in a material is not preferable.

Regarding hydraulic pumps/motors, there is recently a tendency of increase in pressure and further decrease in size, therefore, improvement in seizure resistance and wear resistance is desired for sliding parts constituting the hydraulic pumps/motors, however, the conventional lead bronze, bronze and brass-based contact materials according to the above-mentioned literature (Japan Non-ferrous Metal Casting Association ed., "ENGINEERING DATA BOOK FOR COPPER BASED ALLOY CASTING", Issued by Materials Process Technology Center (SOKEIZAI CENTER), Jul. 30, 1988, p. 134-155) have a problem that they are insufficient in strength, seizure resistance and wear resistance for higher output and further decrease in size.

The present invention has been made in view of the above-mentioned problems, and an object thereof is to provide a thermal spray membrane contact material contact member and contact part, and an apparatus to which they are applied, excellent in seizure resistance and wear resistance under extremely poor lubrication conditions such as high surface pressure and low speed sliding and swinging and the like, and excellent in conformability in sliding and showing excellent seizure resistance and wear resistance even under high speed and high temperature sliding and high surface pressure and high speed sliding.

SUMMARY OF THE INVENTION

One aspect of the present invention is directed to a thermal spray membrane contact material. The thermal spray membrane contact material includes a Mo metal phase, or 5 vol % or more of a Mo metal phase and a metal phase and/or alloy phase containing one or more elements selected from the group consisting of Fe, Ni, Co, Cr, Cu and Zn.

In another aspect, the present invention is directed to a contact member. The contact member includes a contact surface of a contact part base material of an apparatus having a rotation and/or linear contact mechanism, and the contact surface is formed of the thermal spray membrane contact material.

It is to be understood that both the foregoing general description and the following detailed description are exemplary and explanatory only and are not restrictive of the invention, as claimed.

BRIEF DESCRIPTION OF THE DRAWINGS

FIG. 22 shows a view (a) displaying a structure image near a contact surface of a floating bushing in conventional turbo charger, a view (b) displaying distribution state of Pb, and a view (c) displaying distribution of Fe.

FIG. 23 shows a view (a) displaying a structure image near a contact surface of a floating bushing in conventional turbo charger, a view (b) displaying distribution state of Pb, and a view (c) displaying distribution of S.

DETAILED DESCRIPTION OF PREFERRED EMBODIMENTS

Figure 1:
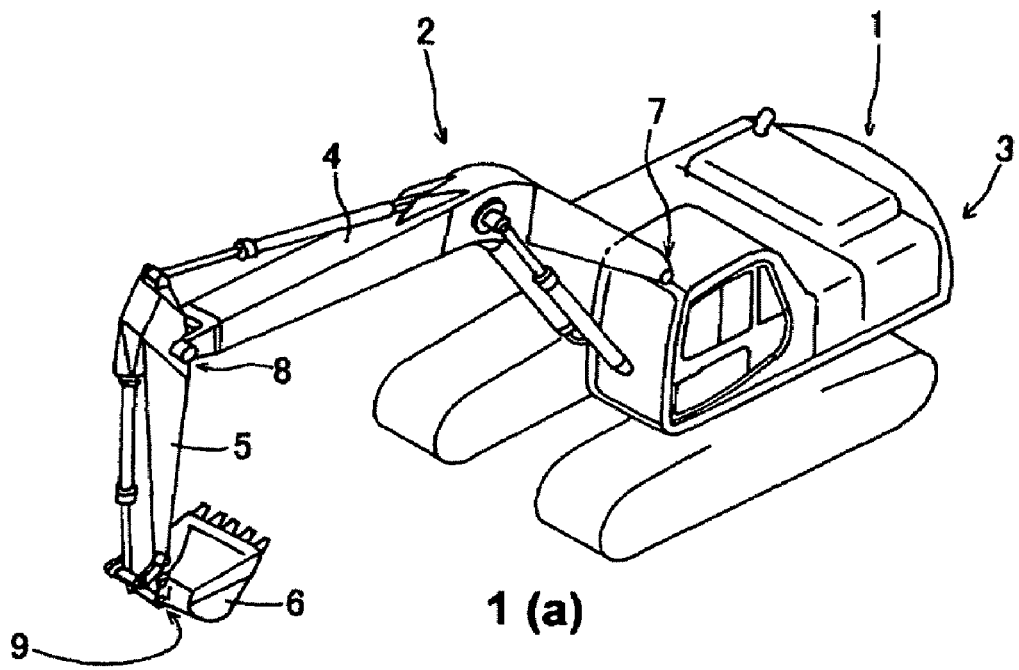
FIG. 1 shows a general perspective view (a) of a hydraulic excavator according to a first embodiment of the present invention, and an exploded perspective view (b) illustrating a bucket connecting portion.
Figure 1:
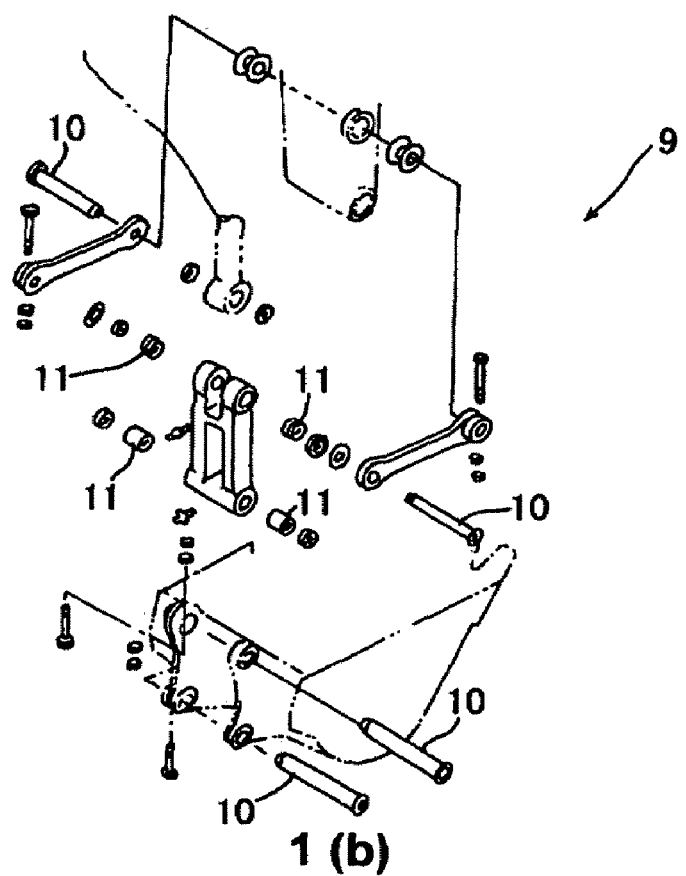

In solving the above-mentioned problems, the present inventors have noticed that a Mo metal phase not converted into alloy has properties that 1) it has strong durability against heat generated in adhesion to Fe and the like, and does not cause easily alloy formation with Fe and the like also in chemical aspect, 2) a membrane ($MoS_2$, $MoO_3$) excellent in lubricity is formed easily on a contact surface because of reaction with S contained in a lubricating oil and $O_2$ in an atmosphere, 3) due to tendency of formation of a membrane excellent in solid lubricity, even a hard Mo metal phase has an extremely little attacking property against an opposite material, and the like, and found that an extremely excellent sliding property can be obtained when a thermal spray membrane composed of a Mo metal phase is used as a contact material. Further, the present inventors have noticed that a metal phase and/or alloy phase containing one or more elements selected from the group consisting of Fe, Ni, Co, Cr, Cu and Zn improves adhesiveness, membrane toughness and compactness and taken also an economical standpoint into consideration due to expensiveness of Mo, and found that also a thermal spray membrane composed of a Mo metal phase in an amount of 10 vol % to 75 vol % and a metal phase and/or alloy phase containing one or more elements selected from the group consisting of Fe, Ni, Co, Cr, Cu and Zn is suitable as a contact material. Base on these findings, the present invention has been completed.

That is, for attaining the above-mentioned object, the thermal spray membrane contact material of the present invention is characterized in that it comprises a Mo metal phase, or 10 vol % or more of a Mo metal phase and a metal phase and/or alloy phase containing one or more elements selected from the group consisting of Fe, Ni, Co, Cr, Cu and Zn.

According to the present invention, there can be obtained a contact material excellent in seizure resistance and wear resistance under extremely poor lubrication conditions such as high surface pressure and low speed sliding and swinging and the like, and excellent in conformability in sliding and showing excellent seizure resistance and wear resistance even under high speed and high temperature sliding and high surface pressure and high speed sliding. In the present invention, the lower limit of the amount of a Mo metal phase is 5 vol % at which seizure resistance under lubrication clearly starts to be improved, and 10 vol % is more preferable. In use under low speed and poor lubrication state, 10 vol % at which seizure resistance starts to be improved is preferable and 20 vol % is more preferable. Under high speed sliding, in the case of a porous thermal spray membrane for making formation of a lubricating oil film on a contact surface in sliding easy, it is preferable that, for preventing the lubricating oil from escaping into pores, the pores are previously filled with a sealer.

In the present invention, it is preferable that a special carbide composed of at least one or more elements selected from the group consisting of W, Ti, Cr, Mo and V is contained in an amount of 10 to 50 vol %.

Further, in the present invention, it is preferable that hard particles of intermetallic compounds such as Mo—Fe, Al—Fe, Ti—Fe and the like, nitrides such as TiN, CrN, $Si_3N_4$ and the like and/or oxides such as NiO, $Cu_2O$, CoO, $TiO_2$, $SiO_2$, $Al_2O_3$ and the like, harder than the mother phase, are dispersed in an amount of 10 vol % or less.

By adopting the above-mentioned constitutions, wear resistance can be further improved, consequently, a contact material can be obtained which can be suitably used even under sliding conditions in which invasion of earth and sand cannot be avoided such as, for example, at a sliding site of a work implement of a hydraulic excavator. Here, specific examples of the above-mentioned special carbide include WC, $W_2C$, $Cr_3C_2$, CrC, $Cr_{23}C_6$, $Fe_3Mo_3C$, $Fe_3W_3C$, $Mo_2C$, $V_4C_3$ and the like which are relatively soft and excellent in heat resistance and thermal shock resistance. The reason for a lower limit of the content of this special carbide of 10 vol % is consideration of an amount of carbides in a wear resistant steel such as, for example, a high speed steel and the like of about 10 vol %. The reason for an upper limit of the content of this special carbide of 50 vol % is consideration of an upper limit of the addition amount at which high toughness is maintained in conventional wear resistant thermal spray membranes of 50 vol %. On the other hand, the reason for an amount of dispersion of hard particles of the above-mentioned nitrides (TiN, CrN, $Si_3N_4$ and the like) and/or oxides (NiO, $Cu_2O$, CoO, $TiO_2$, $SiO_2$, $Al_2O_3$ and the like) of 10 vol % or less is for suppressing an attacking property against a contact opposite material. When further consideration of an attacking property against a contact opposite material is necessary, it is advantageous that dispersion of hard particles of the nitrides and/or oxides is kept at 5 vol % or less. That is, for suppressing an attacking property against a contact opposite material while improving the adhesiveness, toughness and compactness of a thermal spray membrane, it is advantageous that the above-mentioned Mo metal phase is contained in an amount of 10 to 50 vol %, the above-mentioned special carbides (those of relatively soft) are contained in an amount of 10 to 50 vol % and a metal phase or alloy phase mainly containing one or more elements selected from the group consisting of Fe, Ni, Co, Cr, Cu and Zn is contained in the remaining amount, and the above-mentioned hard particles are dispersed in an amount of 5 vol % or less.

In the present invention, it is preferable that oxygen is contained in an amount of 0.1 to 3.0 wt % in the above-mentioned Mo metal phase to form a Mo oxide. When the amount of oxygen contained in the Mo metal phase is thus controlled to 0.1 to 3.0 wt % to form a Mo oxide having high solid lubricity, effects are performed that hardness is enhanced (Hv 450 to 800) to further improve wear resistance, that seizure resistance is remarkably improved by the self lubricating action of the Mo oxide, further that an attacking property against soft S45C and the like is scarcely observed.

When the above-mentioned metal phase and/or alloy phase containing one or more elements selected from the group consisting of Fe, Ni, Co, Cr, Cu and Zn is a more excellent contact material, the addition amount of the above-mentioned Mo metal phase can be reduced to give an economical desirability, and a more excellent sliding property can be obtained.

Then, in the present invention, it is preferable that the above-mentioned metal phase and/or alloy phase containing one or more elements selected from the group consisting of Fe, Ni, Co, Cr, Cu and Zn is composed of a Fe-base alloy containing at least 0.8 wt % or less of C and 10 to 40 wt % of Cu, further, one or more elements selected from the group consisting of Si, Mn, Ni, Cr and Mo in an amount of 5 wt % or less and in which the remainder is composed substantially of Fe and impurities.

In the present invention, the above-mentioned metal phase and/or alloy phase containing one or more elements selected from the group consisting of Fe, Ni, Co, Cr, Cu and Zn may be composed of a Fe-base alloy containing at least 2 to 16 wt % of Al forming a Fe$_3$Al ordered phase, and containing one or more elements selected from the group consisting of 10 to 40 wt % of Cu, 0.8 wt % or less of C, 30 wt % or less of (Ni+Co), 1.5 wt % or less of P and 5 wt % or less of (Mn+Cr+Mo) and in which the remainder is composed substantially of Fe and impurities as disclosed in JP-A No. 9-49006 and JP-A No. 2002-180216 which are prior applications of the applicant.

Here, it is preferable that Cu is added in an amount of 10 to 40 wt % to a Fe-base alloy phase. By this, a Cu alloy phase and a Fe-base alloy phase containing a martensite phase are mutually dispersed to form a hard alloy layer, therefore, seizure resistance, wear resistance and adhesiveness of a thermal spray membrane can be further improved. The lower limit of the addition amount of Cu is determined from a solid/liquid boundary composition in a Fe—Cu-based phase diagram, and the upper limit of the addition amount of Cu is set from the standpoint of decrease in hardness of a Fe-base alloy phase due to decrease in the martensite amount. The carbon content is preferably 0.1 wt % or more at which sufficient martensite hardness is manifested, and the upper limit of the carbon content is advantageously up to 0.8 wt % at which the martensite hardness is approximately saturated. By co-existence of Al with one or more elements selected from the group consisting of Ni, Co, Zn and Mn, remarkable hardening is possible by a two-phase separating reaction of Fe$_3$Al and FeAl type ordered phases, therefore, carbon is not an essential element.

Further, in the present invention, the above-mentioned metal phase and/or alloy phase containing one or more elements selected from the group consisting of Fe, Ni, Co, Cr, Cu and Zn may also be composed of any of the following (A) to (F).

(A) A bronze-base alloy containing at least 5 to 15 wt % of Sn (B) A Cu-base alloy containing at least 2 to 10 wt % of Sn and 2 to 14 wt % of Al, further containing one or more elements selected from the group consisting of Si, Fe, Ni, Co, Mn, Ti, P and Zn in an amount of 10 wt % or less, and containing a Cu—Al-based beta phase in its structure (C) A Cu—Zn-base alloy containing at least 10 to 35 wt % of Zn, and containing one or more elements selected from the group consisting of Al, Si, Fe, Ni, Co, Mn, Ti and Sn in an amount of 10 wt % or less (D) A Cu—Zn-base alloy containing at least 35 to 65 wt % of Zn, further containing one or more elements selected from the group consisting of Al, Si, Fe, Ni, Co, Mn, Ti and Sn in an amount of 10 wt % or less, and containing a Cu—Zn-based beta phase and/or gamma phase in its structure (E) A Ni-base alloy containing at least (Cr+Al+Si+Ti) in an amount of 50 wt % or less (F) A Zn-base alloy containing at least one or more elements selected from the group consisting of Al, Cu, Mg, Sn, Sb, Ti, Fe and Ni in an amount of 30 wt % or less Also by such constitutions, the addition amount of a Mo metal phase can be decreased while maintaining an excellent sliding property, therefore, an effect is performed that cost down can be established.

Here, the above-mentioned bronze-base alloy may be a Cu-base alloy material excellent in seizure resistance and excellent in a bonding property with steel, and may be a bronze material wherein general-purpose various alloy elements such as P, Pb, Ti, Ni, Si, Al, Mn, Fe, Zn and the like are added. Further, the above-mentioned Cu-base alloy is that suggested in JP-A No. 2001-271129 which is a prior application of the applicant, and that alloy elements such as, for example, Ti, Si, Fe, Mn, Ni, Co, P, Zn and the like may be added. Furthermore, the above-mentioned Cu—Zn-base alloy is an alpha phase-based relatively soft material widely utilized in work implement bushings of hydraulic excavators, floating bushings in turbo chargers, contact parts in hydraulic pumps/motors, and the like. By adopting a relatively hard material containing a beta phase and/or gamma phase among brass-based materials, wear resistance and seizure resistance are mainly improved. By adopting a Ni-based alloy, adhesiveness, heat resistance, corrosion resistance and wear resistance are mainly improved. Further, by adding mainly Al, Cu, Mg and Ti into a Zn-base alloy excellent in corrosion resistance but somewhat lack in pressure resistance, pressure resistance is improved, and by adding Sn, Sb and the like into this Zn-base alloy, seizure resistance is further improved.

In the present invention, it is preferable that solid lubricants such as graphite, CaF$_2$, MoS$_2$ and the like is contained in an amount of 5 to 30 wt %. By this, a lubricating ability can be further improved to further improve seizure resistance.

Next, the contact member of the present invention is characterized in that a contact surface of a contact part base material of an apparatus having a rotation and/or linear contact mechanism is formed of the above-mentioned thermal spray membrane contact material.

According to the present invention, the contact member can be suitably used as a constituent material of a contact part constituting a contact portion in equipments. As means for film-forming the above-mentioned thermal spray membrane contact material, in this contact member, there are listed, plasma thermal spraying of which atmosphere can be controlled, arc thermal spraying, flame thermal spraying (including high speed flame thermal spraying), wire explosion thermal spraying and the like. The above-mentioned contact surface can take a desired shape such as cylinder, solid cylinder, plane, sphere and the like.

In the present invention, it is preferable that a ground membrane composed of a Ni or Ni-base alloy or Cu or Cu-base alloy is formed on the above-mentioned contact part base material. By this, the adhesiveness of a thermal spray membrane can be successfully secured even in the case where a member requiring surface treatments such as induction hardening, carburization quenching and the like is used as a base material.

In the present invention, it is preferable that pores in the above-mentioned thermal spray membrane contact material are filled with any of a lubricating oil, a lubricant composition composed of a lubricating oil and waxes, and waxes. By this, a lubricating ability can be successfully manifested.

In the present invention, when pores in the above-mentioned thermal spray membrane contact material are impregnated with a sealer to perform a sealing treatment, an effect is obtained that of corrosion problem through the pores is previously prevented. Further, since fluid lubricity in high speed sliding is improved by the sealing treatment, an effect of decreasing friction coefficient is obtained by applying the thermal spray membrane contact material to piston shoes, cylinder blocks, valve plates and the like of hydraulic pumps and hydraulic motors described later. The sealer may be selected from general-purpose organic materials such as silicon, acrylic and epoxy-based resins and the like or water glass-based inorganic materials.

In the present invention, it is preferable that the above-mentioned contact part base material is constituted of a porous sintered material, and pores in this porous sintered material are filled with any of a lubricating oil, a lubricant composition composed of a lubricating oil and waxes, and waxes. By this, a lubricating substance is accumulated in large amount in a porous sintered material constituting a base material, therefore, it becomes possible to feed a lubricating substance onto a contact surface through the thermal spray membrane contact material for a long period of time.

Next, the contact part having a contact surface formed of the above-mentioned thermal spray membrane contact material may be any of the following (1) to (7).

(1) A bearing bushing, bearing pin, thrust bearing, track bushing or crawler belt pin utilized in work implements, suspensions, car body coupling devices, crawler belt type traveling systems and the like (2) A roller axis, roller, roller bushing or thrust bushing utilized in a roller apparatus of a crawler belt type traveling system (3) A floating seal used for oil seal of a roller apparatus of a gear speed reducer or crawler belt type traveling system (4) A floating bushing or turbine shaft utilized in a turbo charger (5) An engine valve (6) A cylinder block, valve plate, rocker cam, cradle, piston, piston shoe, cam ring, pintle, piston rod or drive shaft used in a hydraulic piston pump and/or hydraulic piston motor apparatus (7) A wedge or wedge guide used in a rock mass crushing wedge apparatus By these constitutions, there can be obtained a contact part excellent in seizure resistance and wear resistance under extremely poor lubrication conditions such as high surface pressure and low speed sliding and swinging and the like, and excellent in conformability in sliding and showing excellent seizure resistance and wear resistance even under high speed and high temperature sliding and high surface pressure and high speed sliding.

The connecting apparatus according to the present invention is a connecting apparatus connecting a machine constituent element on one side with a machine constituent element on another side placed via a supporting axis supported by the machine constituent element on one side and via a bearing bushing outer-engaged on this supporting axis so that these elements are connected mutually revolvable or rotatable, or a connecting apparatus connecting a machine constituent element on one side with a machine constituent element on another side placed via a supporting axis supported by the machine constituent element on one side and a bearing bushing outer-engaged on this supporting axis so that these elements are mutually connected revolvable or rotatable, and having a thrust bearing which bears and supports thrust load acting between the above-mentioned machine constituent element on one side and the above-mentioned machine constituent element on another side, wherein one or more of the above-mentioned supporting axis, bearing bushing and thrust bearing are made of the above-mentioned contact member as a constituent material.

According to the present invention, one or more of a supporting axis, bearing bushing and thrust bearing placed at a connecting site of an apparatus are made of the contact member as a constituent material, therefore, it can be a connecting apparatus suitable for use under severe sliding conditions such as high surface pressure and low speed sliding, high speed and high temperature sliding, high surface pressure and high speed sliding, and the like.

In the present invention, it is preferable that the thermal spray membrane contact material is film-formed on a supported surface of the above-mentioned supporting axis relative to the above-mentioned machine constituent element on one side. With this arrangement, even if the machine constituent element on one side and the supported surface of a supporting axis come into friction by rotation slight movement and flexure of the supporting axis when large load is imposed on the supporting axis, generation of noise accompanied by uncomfortableness can be previously prevented. Here, the Mo metal phase according to the thermal spray membrane contact material film-formed on the supported surface of the supporting axis has a property of scarce attacking even if the supporting portion of the machine constituent element on one side supporting the supporting axis is made of a relatively soft material such as, for example, S45C normalized steel of about HRC 25, consequently, it is not necessary to improve seizure resistance and wear resistance by performing a hardening heat treatment such as induction hardening and the like on the supporting surface of the supporting portion, and there is a merit in cost. It is possible to film-form the thermal spray membrane contact material to be film-formed on the supported surface of the supporting axis, as a thermal spray membrane of high density having a porosity of 1 to 15 vol %, by, for example, a high speed flame thermal spray method (HVOF: High Velocity Oxygen Fuel), however, even such a thermal spray membrane of high density maintains an oil-containing property.

In the present invention, it is preferable that the above-mentioned supporting axis is made of the above-mentioned contact member as a constituent material, and the above-mentioned bearing bushing is that constituted of a sintered material of a Fe—C-based, Fe—C—Cu-based or Cu—Sn-based alloy having a content of pores of 5 to 30 vol % in which the pores are filled with a lubricating oil or lubricant composition, or that constituted of a sintered material of a Fe—C-based, Fe—C—Cu-based or Cu—Sn-based alloy having a content of pores of 5 to 30 vol % in which the pores are filled with a lubricating oil or lubricant composition and a solid lubricant is dispersed therein.

In the present invention, by applying the above-mentioned contact member as a constituent material of the supporting axis, the supporting axis is allowed to support a sliding function. Therefore, a relatively cheap bearing bushing can be adopted as a contact opposite of the supporting axis, and cost can be decreased. In the present invention, since the bearing bushing is constituted of an oil-containing sintered material capable of storing a large amount of lubricating oil or lubricant composition, feeding of a lubricating oil onto a contact surface can be stabilized over a long period of time, and greasing interval can be remarkably prolonged. Further, in the present invention, since the supporting axis which is removed easily in general as compared with a bearing bushing is allowed to support a sliding function, the sliding function can be recovered easily by substituting the supporting axis having a sliding function decreased with a new article or by film-forming the above-mentioned thermal spray membrane contact material on a worn part to repair the axis for re-use. Therefore, a maintenance property can be improved remarkably.

In the present invention, a hard material containing 50 vol % or more of a martensite phase in a base structure of the sintered material is preferable, however, a surface treatment such as a carburization quenching treatment, gas soft nitriding, nitriding, sulfurizing, sulfurizing nitriding or the like may be performed further on its contact surface. Furthermore, the above-mentioned hard particles and solid lubricating particles such as carbides, nitrides, oxides, phosphides, tool steel powder, cemented carbide, Co-based alloy, ferro-molybdenum, ferro-chromium, graphite, $CaF_2$ and the like may be dispersed in suitable amount in its base structure. Since the film thickness of the above-mentioned thermal spray membrane contact material film-formed on the supporting axis is relatively thin, it is preferable that the amount of hard particles to be dispersed is suppressed to 5 vol % or less, in the case of dispersion of the hard particles in a base structure of a sintered material constituting the bearing bushing, from the standpoint of preventing the membrane from being worn as much as possible. It is also preferable that the above-mentioned thermal spray membrane contact material film-formed on the supporting axis is allowed to contain a special carbide such as WC and the like according to the above-mentioned second invention, to further enhance the wear resistance of the thermal spray membrane contact material.

Furthermore, it is preferable that the above-mentioned bearing bushing or thrust bearing is more excellent in wear resistance.

Therefore, in the present invention, it is preferable that the above-mentioned bearing bushing is constituted of a porous Fe-base alloy-based sintered contact material containing at least 2 to 16 wt % of Al forming a $Fe_3Al$ ordered phase, and containing one or more elements selected from the group consisting of 10 to 40 wt % of Cu, 1.5 wt % or less of C, 20 wt % or less of Ni and 1.5 wt % or less of P.

The above-mentioned bearing bushing may be constituted of a porous Cu-base alloy-based sintered contact material containing at least 2 to 10 wt % of Sn and 2 to 14 wt % of Al, and containing a Cu—Al-based beta phase in its structure.

It is preferable that a thermal spray membrane composed of at least 10 to 50 vol % of a Mo metal phase and 10 to 50 vol % of a special carbide of W, Ti, Cr, Mo, V and the like, and a metal phase or alloy phase containing one or more elements selected from the group consisting of Ni, Cr, Cu, Co and Fe in the remaining amount, is formed on a contact surface of the above-mentioned thrust bearing. As the contact opposite material of the thrust bearing, a thermal spray membrane contact material of the same kind is not preferable, and it is preferable to utilize hard steel hardened by heat treatment (for example, quenching tempering, carburizing quenching tempering treatment and the like) also from the economical standpoint.

The connecting apparatus according to the present invention is suitably used as a connecting means at a connecting site of any of a track link of a crawler type lower structure, a roller of this lower structure, an equalizer supporting the body of a bulldozer and a suspension apparatus of a dump truck, and the like.

The turbo charger apparatus of the present invention is a turbo charger apparatus having a floating bushing inserted between a bearing surface formed on a supporting body and an axis portion of a turbine, wherein the above-mentioned thermal spray membrane contact material is film-formed on the outer circumferential surface and the inner circumferential surface of the above-mentioned floating bushing, or on the outer circumferential surface of the above-mentioned floating bushing and the outer circumferential surface of the above-mentioned axis portion of a turbine.

According to the present invention, the above-mentioned thermal spray membrane contact material is film-formed on the outer circumferential surface and the inner circumferential surface of a floating bushing inserted between a bearing surface formed on a supporting body and an axis portion of a turbine, or on the outer circumferential surface of the floating bushing and the outer circumferential surface of the axis portion of a turbine, consequently, a turbo charger apparatus excellent in seizure resistance and wear resistance can be obtained. In this turbo charger apparatus, clearance between the axis portion of a turbine and the floating bushing and clearance between the floating bushing and the supporting body are each strictly managed, to ensure fluid lubricity with a lubricating oil in rotation at high speed, therefore, to prevent large change in clearance between the floating bushing and the axis portion of a turbine generally made of steel and the supporting body made of cast iron due to difference in thermal expansion leads to previous prevention of problems such as seizure by increase in sliding resistance, and the like. Therefore, the base material of the floating bushing in the present invention is preferably a steel, cast iron or Fe-based sintered material having a thermal expansion coefficient of 1.1 to $1.5 \times 10^{-5}$ also from the economical standpoint. To thus adopt a porous Fe-base alloy-based sintered material capable of containing a lubricating oil as the base material of the floating bushing has a merit that adhesion under initial operating condition in which a lubricating oil cannot be sufficiently fed can be surely prevented.

Next, the engine valve apparatus of the present invention is an engine valve apparatus constituted of a valve opening and closing a combustion chamber of an engine, and a valve guide guiding the motion of the valve, wherein the above-mentioned thermal spray membrane contact material is film-formed on a contact surface of the above-mentioned valve contacting with the above-mentioned valve guide.

According to the present invention, it is of course possible to obtain an engine valve excellent in seizure resistance and wear resistance, and additionally, Pb added conventionally in large amount into the base material of a valve guide can be decreased or deleted.

Next, the hydraulic piston pump and/or hydraulic piston motor apparatus of the present invention is characterized in that at least one of the above-mentioned contact parts is incorporated.

According to the present invention, the hydraulic piston pump and/or hydraulic piston motor apparatus can get increased pressure, increased speed and decreased size. Inclined shaft mode hydraulic piston pumps and/or hydraulic piston motors have a problem of tendency of generation of noise since the sliding speed at a spherical portion of a piston rod and drive shaft is as extremely low as 0.1 m/sec or less and lubrication condition at this contact surface tends to be boundary lubrication. Accordingly, in one extremely preferable embodiment of the inclined shaft mode hydraulic piston pumps and/or hydraulic piston motors, a contact part obtained by film-forming the thermal spray membrane contact material of the present invention on a spherical portion of a piston head or a spherical recess of a drive shaft is incorporated.

Next, the rock mass crushing wedge apparatus of the present invention is a rock mass crushing wedge apparatus comprising a wedge receiving a thrust from a thrust generating means and a pair of wedge guides so placed as to sandwich this wedge in which the above-mentioned wedge is allowed to slide against the above-mentioned wedge guides by driving of the above-mentioned thrust generating means, to convert the thrust from the thrust generating means into a transverse direction width expanding force by these wedge guides, and a rock mass is broken by this transverse direction width expanding force to perform a stone-splitting work, wherein the above-mentioned thermal spray membrane contact material is film-formed on a contact surface of the above-mentioned wedge or wedge guides.

According to the present invention, a larger rock mass-splitting force can be obtained and running cost can be remarkably reduced.

Next, the floating seal apparatus of the present invention is characterized in that a thermal spray membrane composed of at least 10 to 50 vol % of a Mo metal phase and 10 to 50 vol % of a special carbide of W, Ti, Cr, Mo, V and the like, and a metal phase or alloy phase containing one or more elements selected from the group consisting of Ni, Cr, Cu, Co and Fe in the remaining amount, is formed on a seal surface.

Usually, high carbon high Cr cast steel is used as the floating seal and the hardness of this seal surface is controlled to HRC 60 or more in many cases, however, from the standpoint of recent increase in speed of a car body and improvement in durability thereof, there is a desire for development of a floating seal excellent in seizure resistance and wear resistance. In the present invention, a thermal spray membrane composed of at least 10 to 50 vol % of a Mo metal phase and 10 to 50 vol % of a special carbide of W, Ti, Cr, Mo, V and the like, and a metal phase or alloy phase containing one or more elements selected from the group consisting of Ni, Cr, Cu, Co and Fe in the remaining amount, is formed on a seal surface, consequently, a floating seal apparatus having more excellent seizure resistance and wear resistance can be provided. In the present invention, it is preferable to perform a sealing treatment by resorption of resin on a thermal spray membrane contact material to prevent invasion of water and the like through pores having air permeability in the thermal spray membrane contact material. As the method of film-forming a thermal spray membrane contact material, high speed flame thermal spray (HVOF: High Velocity Oxygen Fuel) by which a thermal spray membrane of high density is easily formed is preferable. Since the above-mentioned metal phase or alloy phase containing one or more elements selected from the group consisting of Ni, Cr, Cu, Co and Fe is required to be excellent in corrosion resistance and be hard, it is preferably an alloy phase containing at least one or more elements selected from the group consisting of Al, Si, Ti and B in a Ni—Cr alloy system or an alloy phase containing at least one or more elements selected from the group consisting of Co, Ni, Cr and Al in Fe.

Specific embodiments of the thermal spray membrane contact material, contact member and contact part and the apparatus to which these are applied of the present invention will now be illustrated referring to drawings.

First Embodiment

Figure 2:
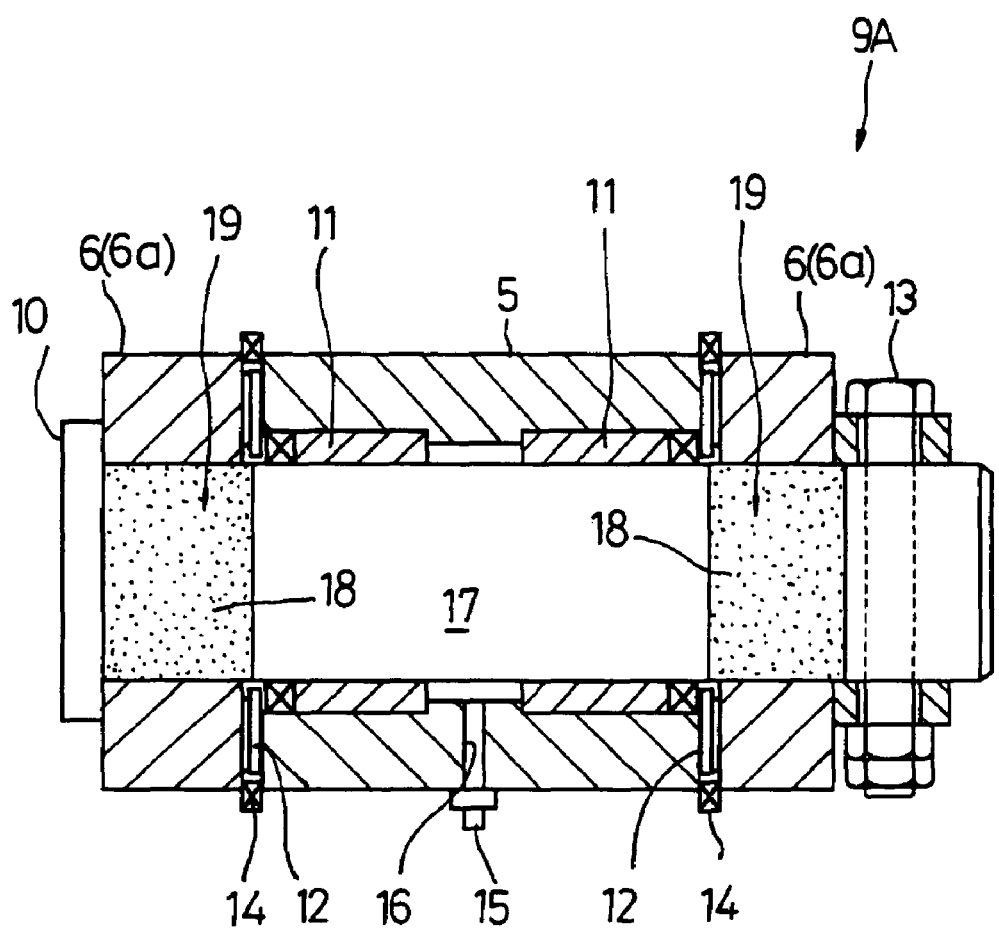
FIG. 2 is a schematic structure explanation view of a bucket connecting apparatus according to a first embodiment of the present invention.
Figure 3:
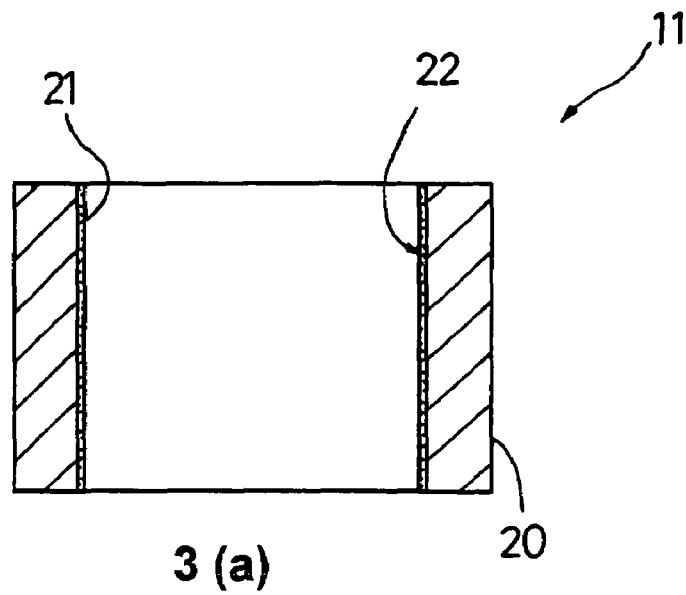
FIG. 3 shows a structure explanation view (a) of a work implement bushing and a structure explanation view (b) of a thrust bearing.
Figure 3:
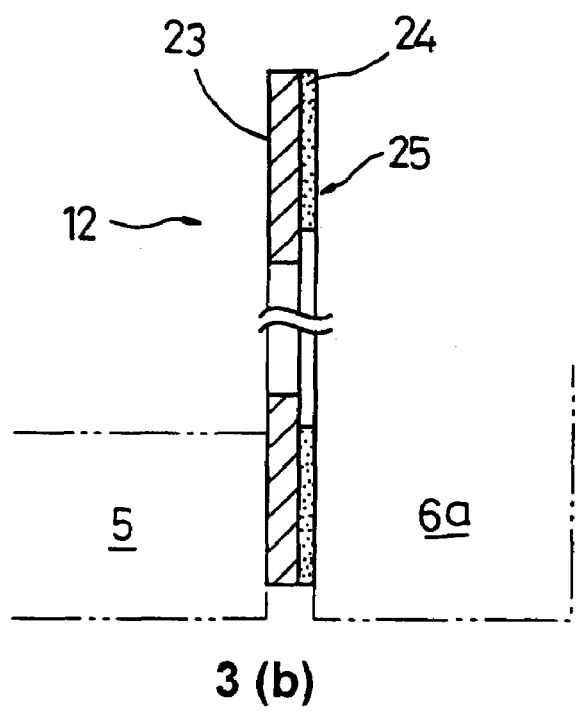

FIG. 1 shows a general perspective view (a) of a hydraulic excavator according to a first embodiment of the present invention, and an exploded perspective view (b) illustrating a bucket connecting portion, respectively. FIG. 2 shows a schematic structure explanation view of a bucket connecting apparatus according to a first embodiment of the present invention. FIG. 3 shows a structure explanation view (a) of a work implement bushing and a structure explanation view (b) of a thrust bearing, respectively.

A work implement 2 of a hydraulic excavator 1 according to this embodiment is constituted by connecting a boom 4, arm 5 and bucket 6 by a boom connecting apparatus 7, arm connecting apparatus 8 and bucket connecting apparatus 9, respectively, in the order from an upper structure 3. The connecting apparatuses 7, 8, 9 are basically in the same structure, and for example, the bucket connecting apparatus 9 is constituted of work implement connecting pins 10 and work implement bushings 11. The detailed structure of a bucket connecting apparatus 9A placed at a connecting site of the arm 5 and the bucket 6 will be illustrated below referring to FIG. 2.

The above-mentioned bucket connecting apparatus 9A has a bucket 6 (machine constituent element on one side); an arm 5 (machine constituent element on another side) placed via a work implement connecting pin 10 (supporting axis) and work implement bushings 11, 11 (bearing bushing) outer-engaged on the work implement connecting pin 10 supported on brackets 6a, 6a formed on the bucket 6, the bucket 6 and the arm 5 being connected so that they can mutually rotate; and thrust bearings 12, 12 bearing and supporting thrust load acting between the bucket 6 and the arm 5. In this bucket connecting apparatus 9A, the work implement bushings 11, 11 are press-fitted to the end portion of the arm 5, and the work implement connecting pin 10 is fixed to a bracket 6a by a pin fixing through bolt 13. Those represented by a numeral 14 are sealing apparatuses. Those represented by numerals 15 and 16 are a lubricating oil feeding port and a lubricating oil feeding route, respectively.

The above-mentioned work implement connecting pin 10 is constituted of a base material 17 made of steel having an axis function and, contact surfaces 19, 19 formed of a thermal spray membrane contact material 18 according to any of Nos. 1 to 16 in Table 1, which are film-formed on this base material 17. In this work implement connecting pin 10, the above-mentioned contact surfaces 19, 19 are placed on a supported surface site of the work implement connecting pin 10 relative to the above-mentioned bracket 6a.

TABLE 1

| Thermal Spray Membrane Contact Material No. | Mo Metal Phase | Special Carbide (10 to 50 vol %) [Note 1] | Hard Particles (10 vol % or less) [Note 2] | Oxygen (0.1 to 3.0 wt %) | Metal Phase and/or Alloy Phase [Note 3] |
|---|---|---|---|---|---|
| 1 | ○ (100 vol %) | | | | |
| 2 | ○ | ○ | | | |
| 3 | ○ | | ○ | | |
| 4 | ○ | ○ | ○ | | |
| 5 | ○ | | | ○ | |
| 6 | ○ | ○ | | ○ | |
| 7 | ○ | | ○ | ○ | |
| 8 | ○ | ○ | ○ | ○ | |
| 9 | ○ (10 vol % or more) | | | | ○ |
| 10 | ○ (10 vol % or more) | ○ | | | ○ |
| 11 | ○ (10 vol % or more) | | ○ | | ○ |
| 12 | ○ (10 vol % or more) | ○ | ○ | | ○ |

TABLE 1-continued

| Thermal Spray Membrane Contact Material No. | Composition Component | | | | |
|---|---|---|---|---|---|
| | Mo Metal Phase | Special Carbide (10 to 50 vol %) [Note 1] | Hard Particles (10 vol % or less) [Note 2] | Oxygen (0.1 to 3.0 wt %) | Metal Phase and/or Alloy Phase [Note 3] |
| 13 | ○ (10 vol % or more) | | | ○ | ○ |
| 14 | ○ (10 vol % or more) | ○ | | ○ | ○ |
| 15 | ○ (10 vol % or more) | | ○ | ○ | ○ |
| 16 | ○ (10 vol % or more) | ○ | ○ | ○ | ○ |

[Note 1]: The special carbide is composed at least of one or more elements selected from the group consisting of W, Ti, Cr, Mo and V.
[Note 2]: The hard particles are composed of intermetallic compounds such as Mo—Fe, Al—Fe, Ti—Fe and the like, nitrides such as TiN, CrN, $Si_3N_4$ and the like and/or oxides such as NiO, $Cu_2O$, CoO, $TiO_2$, $SiO_2$, $Al_2O_3$ and the like, harder than the mother phase.
[Note 3]: The metal phase and/or alloy phase contains one or more elements selected from the group consisting of Fe, Ni, Co, Cr, Cu and Zn, and is composed of any of the following (a) to (h).
(a) A Fe-base alloy containing at least 0.8 wt % or less of C and 10 to 40 wt % of Cu.
(b) A Fe-base alloy containing at least 2 to 16 wt % of Al forming a $Fe_3Al$ ordered phase, and containing one or more elements selected from the group consisting of 10 to 40 wt % of Cu, 0.8 wt % or less of C, 30 wt % or less of Ni, and 1.5 wt % or less of P.
(c) A bronze-base alloy containing at least 5 to 15 wt % of Sn.
(d) A Cu-base alloy containing at least 2 to 10 wt % of Sn and 2 to 14 wt % of Al, and containing a Cu-Al-based beta phase in its structure.
(e) A Cu—Zn-base alloy containing at least 10 to 35 wt % of Zn, and containing one or more elements selected from the group consisting of Al, Si, Fe, Ni, Co and Mn in an amount of 10 wt % or less.
(f) A Cu—Zn-base alloy containing at least 35 to 65 wt % of Zn, containing one or more elements selected from the group consisting of Al, Si, Fe, Ni, Co and Mn in an amount of 10 wt % or less, and containing a Cu—Zn-based beta phase and/or gamma phase in its structure.
(g) A Ni-base alloy containing at least (Cr + Al) in an amount of 50 wt % or less.
(h) A Zn-base alloy containing at least one or more elements selected from the group consisting of Al, Cu, Mg, Sn, Sb, Ti, Fe and Ni in an amount of 30 wt % or less.

The above-mentioned work implement bushing 11 is constituted of a cylindrical base material 20 endowed with a slip bearing function and, a contact surface 22 formed of a thermal spray membrane contact material 21 according to any of Nos. 1 to 16 in Table 1, which is film-formed on the inner circumferential surface of this base material 20, as shown in FIG. 3 (a). In this work implement bushing 11, the above-mentioned base material 20 is formed of a porous Fe-based sintered material.

As shown in FIG. 3(b), the above-mentioned thrust bearing 12 comprises a base material 23 made of steel in the form of hollow disk and, a contact surface 25 formed of a thermal spray membrane contact material 24 according to any of Nos. 1 to 16 in Table 1, which is film-formed on the surface of this base material 23. The thrust bearing 12 is endowed with a slip bearing function which receives and supports, by slip contact, thrust load imparted from the bucket 6 (rotating body) to the arm.

According to the above-mentioned embodiment, since the contact surface 22 is formed of a thermal spray membrane contact material 21 according to any of Nos. 1 to 16 in Table 1, a connecting apparatus suitably used under severe contact conditions such as high surface pressure and low speed sliding can be obtained. Since the base material 20 of the work implement bushing 11 is made of a porous Fe-based sintered material capable of storing a large amount of a lubricating oil or a lubricant composition, feeding of a lubricating oil to the contact surface 22 can be stabilized for a long period of time, and the greasing interval can be remarkably prolonged. And since the contact surface 19 formed of a thermal spray membrane contact material 18 according to any of Nos. 1 to 16 in Table 1 is placed on the supported surface site of the work implement connecting pin 10, generation of noise accompanied by uncomfortableness can be previously prevented, even if the above-mentioned bracket 6a and the supported surface portion of the work implement connecting pin 10 come into friction by rotation slight movement and flexure of the work implement connecting pin 10 when large load acts on the work implement connecting pin 10.

In the above-mentioned embodiment, though the thermal spray membrane contact material 18 film-formed on the work implement connecting pin 10 may be either a porous body or high density body, since increase in the thickness of its thermal spray membrane is disadvantage in many cases from the standpoint of wear life, the thermal spray membrane contact material 18 is preferably a that of high density to further enhance wear resistance, further, it is preferable to disperse hard particles of carbides composed of one or more elements selected from the group consisting of W, Ti, Cr, Mo, V and the like and, $Fe_3P$ (phosphorus iron compound), NiAl, $CaF_2$ and the like into a membrane. It is often necessary to perform heat treatments such as induction hardening and tempering and carburization quenching and tempering and the like on the above-mentioned work implement connecting pin 10 for high strengthening purpose, and in the case of hardening the above-mentioned thermal spray membrane contact material 18, deterioration of the adhesiveness of its thermal spray membrane is suspected, however, in this case, it is preferable to film-form the thermal spray membrane contact material 18 after thermal-spraying a Ni-base alloy or Cu-base alloy excellent in adhesiveness previously on the base material of the work implement connecting pin 10.

Second Embodiment

Figure 4:
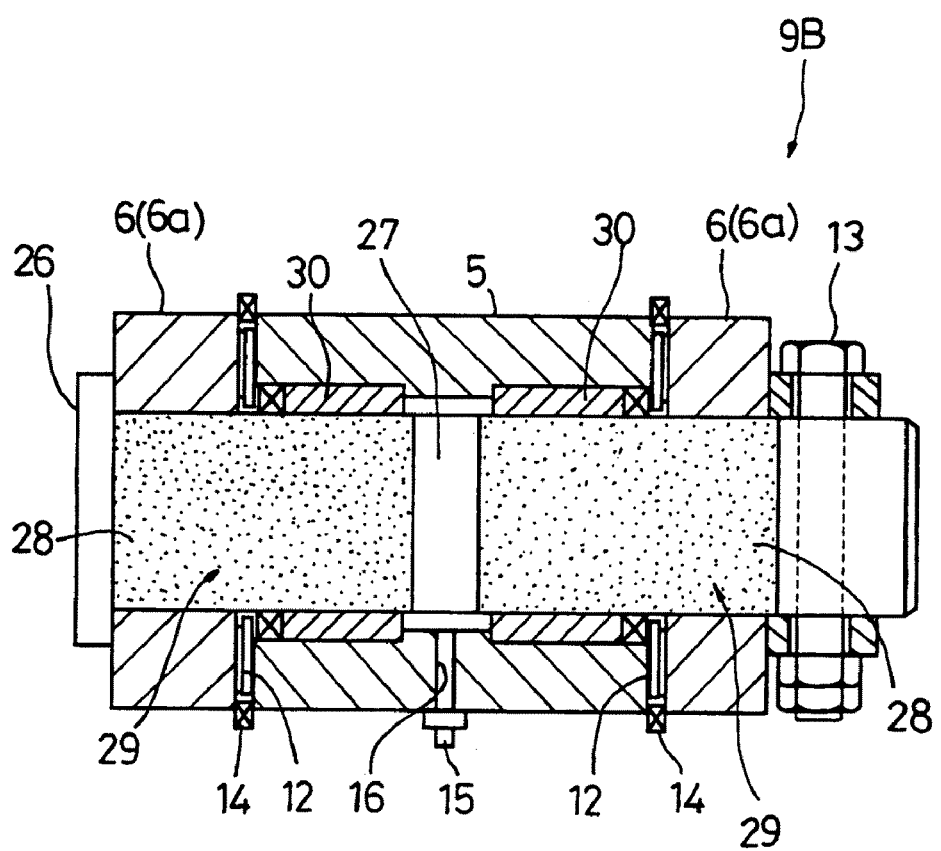
FIG. 4 is a schematic structure explanation view of a bucket connecting apparatus according to a second embodiment of the present invention.

FIG. 4 shows a schematic structure explanation view of a bucket connecting apparatus according to a second embodiment of the present invention. In the bucket connecting apparatus 9B of this embodiment, its basic constitutions are the same as those of the aforementioned embodiment except that the constitutions of the work implement connecting pin and work implement bushing are different. Therefore, only portions characteristic to the embodiment will be illustrated, and portions common to the aforementioned embodiment are provided with the same numerals and the detailed description thereof will be omitted.

The work implement connecting pin 26 of this embodiment comprises a base material 27 made of steel having an axis function, and a contact surface 29 formed of a thermal spray membrane contact material 28 according to any of Nos. 1 to 16 in Table 1, which is film-formed on this base material 27, and this contact surface 29 is placed at least on a supported surface site of the work implement connecting pin 26 relative to the bracket 6a and on a slip contact surface with the work implement bushing 30.

On the other hand, the work implement bushing 30 is made mainly of a hard iron-based sintered oil-containing bearing material, and at least the inner side surface layer portion as a contact surface is made of a porous Fe—C-based, Fe—C—Cu-based or Cu—Sn-based alloy sintered contact material, and pores in the Fe—C-based, Fe—C—Cu-based or Cu—Sn-based alloy sintered contact material are filled with a lubricant composition such as a lubricating oil and the like.

According to this embodiment, since the work implement connecting pin 26 is allowed to support a sliding function, a relatively cheap work implement bushing 30 can be adopted as a contact opposite of the work implement connecting pin 26, and cost can be decreased. Since the work implement bushing 30 is constituted of an oil-containing sintered material capable of storing a large amount of a lubricating oil or a lubricant composition, feeding of a lubricating oil to the contact surface 29 can be stabilized for a long period of time, and the greasing interval can be remarkably prolonged. Further, in this embodiment, since the work implement connecting pin 26 which is removed easily in general as compared with the work implement bushing 30 is allowed to support a sliding function, the sliding function can be recovered easily by substituting the work implement connecting pin 26 having a sliding function decreased with a new article or by film-forming the above-mentioned thermal spray membrane contact material 28 on a worn part to repair the pin for re-use. Therefore, a maintenance property can be improved remarkably. The work implement bushing 30 of this embodiment may be made of a known porous contact material having more excellent seizure resistance.

Figure 5:
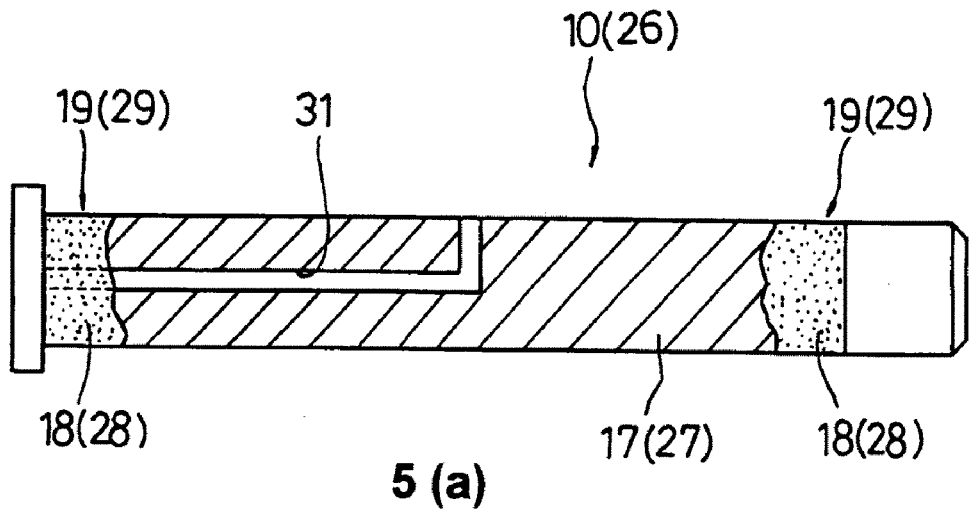
FIGS. 5 (a), (b) are views showing other embodiments examples of a work implement connecting pin.
Figure 5:
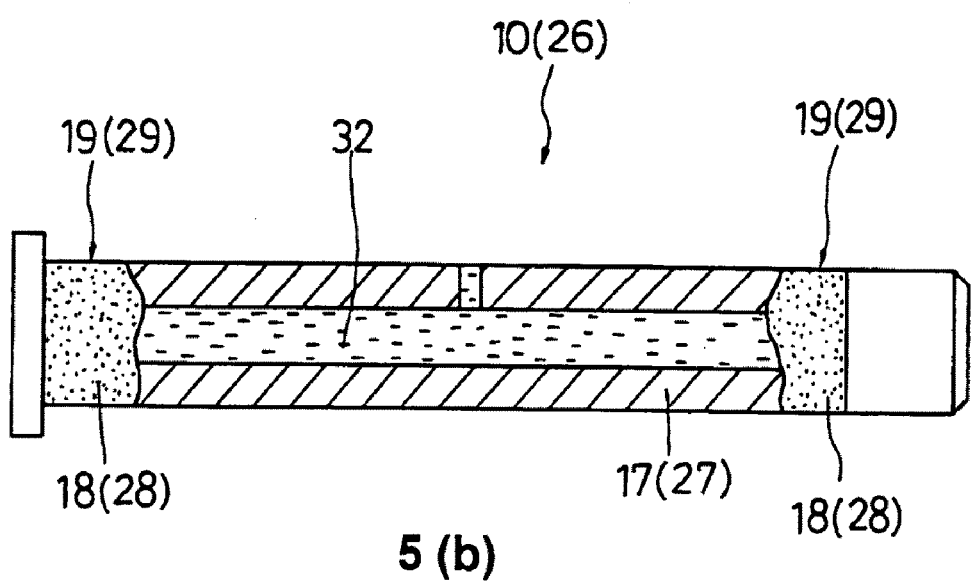

It is preferable from the standpoint of decrease in weight and maintenance of a lubricating ability for a long period of time, to form a lubricating oil feeding route 31 as shown in FIG. 5 (a) and a lubricating oil storage portion 32 as shown in FIG. 5 (a) on the work implement connecting pins 10, 26 according to the first embodiment and the second embodiment, respectively.

Figure 6:
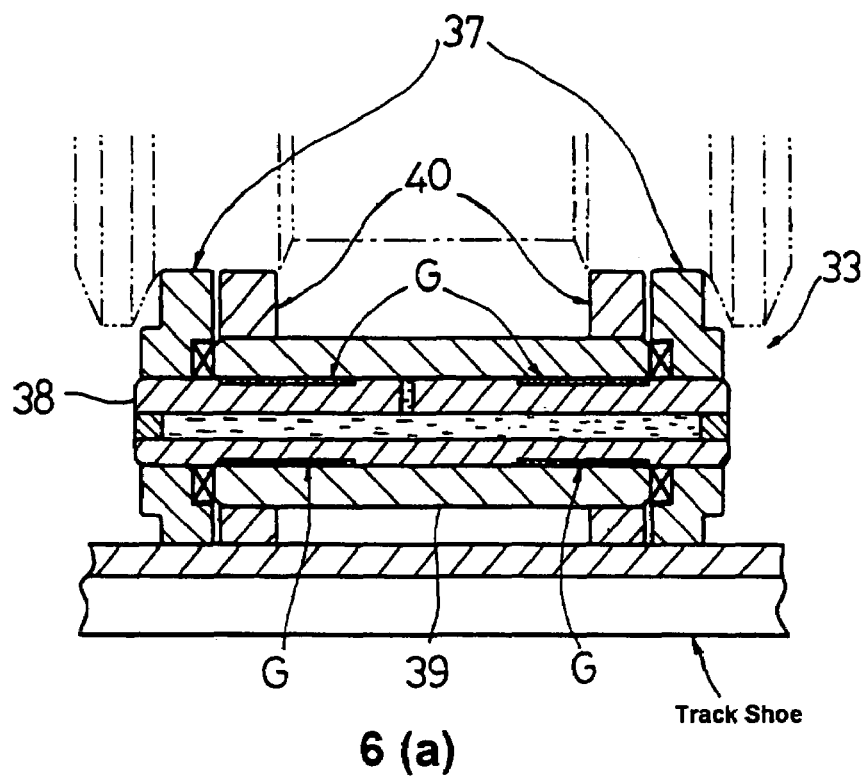
FIG. 6 shows a schematic structure explanation view (a) of a crawler assembly and a schematic view (b) explaining an equalizer mechanism.
Figure 6:
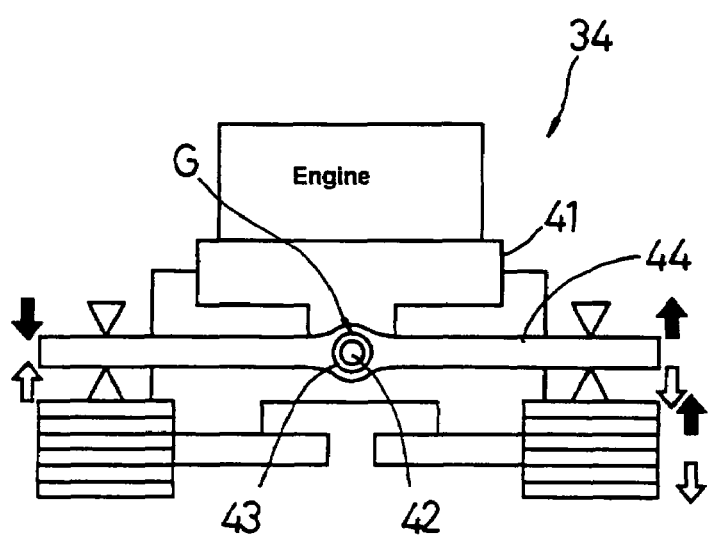
Figure 7:
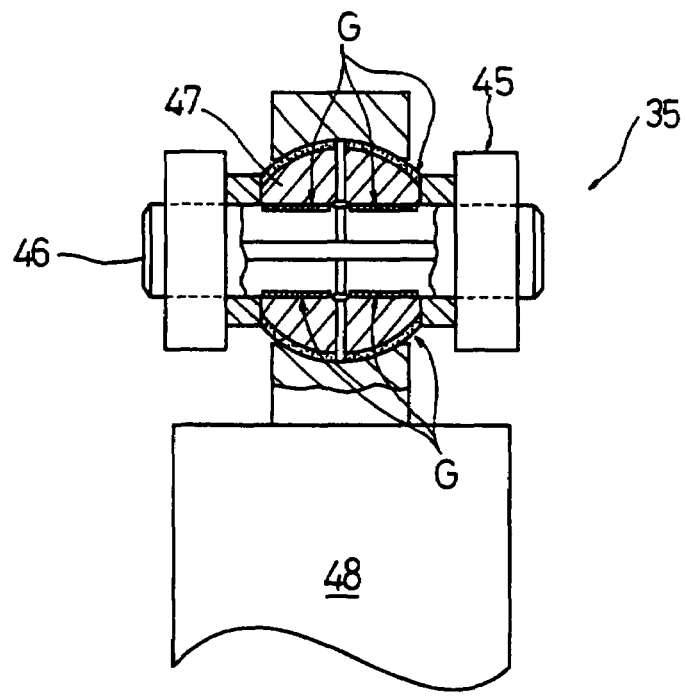
FIG. 7 shows a main part structure explanation view (a) of a suspension apparatus and a main part structure explanation view (b) of a roller assembly.
Figure 7:
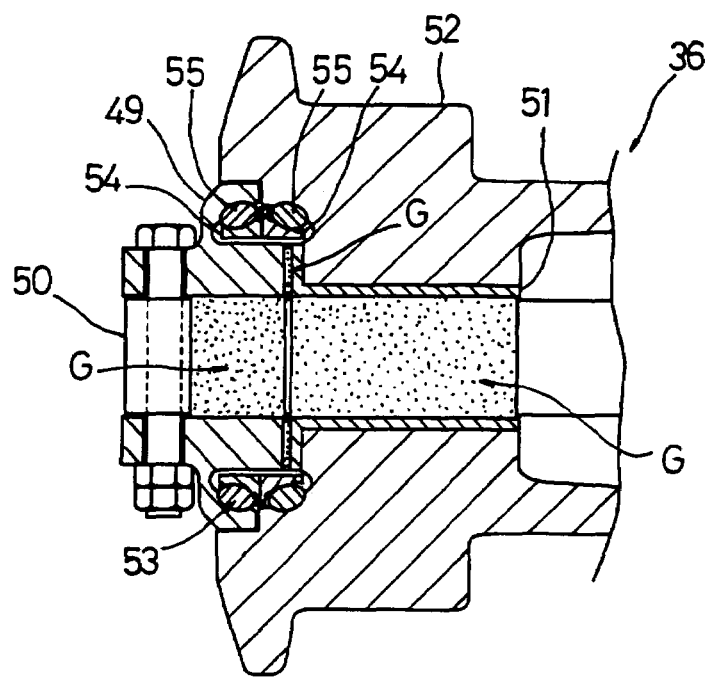

The basic connecting structures of respective connecting sites of a crawler assembly 33 in a crawler type lower structure shown in FIG. 6 (a), an equalizer mechanism 34 supporting the body of a bulldozer shown in FIG. 6 (b), a suspension apparatus 35 of a dump track and the like shown in FIG. 7 (a) and a roller assembly 36 of a crawler type lower structure shown in FIG. 7 (b) are similar to that of the bucket connecting apparatuses 9 (9A/9B) according to the first embodiment and the second embodiment. Namely, a machine constituent element on one side (link set 37, main frame 41, car body frame 45, roller retainer 49, on one side) and, a machine constituent element on another side (link set 40, equalizer bar 44, suspension 48, roller 52, on another side) placed via a supporting axis (crawler pin 38, equalizer pin 42, suspension supporting pin 46, roller shaft 50) supported to this machine element on one side and a bearing bushing (crawler bushing 39, equalizer bushing 43, spherical bushing 47 (degree of freedom: 2), roller bushing 51 (collared bushing)) outer-engaged on this supporting axis are connected so that the elements can mutually rotate or revolve. Therefore, by applying the connecting apparatus according to the present invention like in the first embodiment and the second embodiment as the connecting apparatus at the connecting site, the same actions and effects as in these embodiments can be obtained. In FIGS. 6 (a), (b) and FIGS. 7 (a), (b), a site represented by a reference number G is a site on which a thermal spray membrane contact material according to any of Nos. 1 to 16 in Table 1 is suitably film-formed.

Third Embodiment

Next, a third embodiment of the present invention will be illustrated. This embodiment is an example in which the present invention is applied to a floating seal apparatus in a roller assembly 36 shown in FIG. 7 (b).

In the roller assembly 36 according to this embodiment, a roller retainer 49 and, a roller 52 placed via a roller shaft 50 supported to this roller retainer 49 and a roller bushing 51 (collared bushing) outer-engaged to the roller shaft 50 are connected so that they can mutually rotate, as described above. In this roller assembly 36, a floating seal apparatus 53 has a pair of sealing rings 54, 54 so placed that seal surfaces mutually face, and an O ring 55 outer-engaged on each seal ring 54, and a pair of facing seal surfaces slide in contact under suitable surface pressure while being pushed toward the axial direction of the roller shaft 50 by elasticity of the O ring 55 installed under compression, to prevent invasion of water and the like from outside and leakage of a lubricating oil from inside. Further, a thermal spray membrane composed at least of 10 to 50 vol % of a Mo metal phase, 10 to 50 vol % of a special carbide of W, Ti, Cr, Mo, V and the like, and a metal phase or alloy phase containing one or more elements selected from the group consisting of Ni, Cr, Cu, Co and Fe in the remaining amount is formed on a seal surface of at least one seal ring 54 of the couple of seal rings 54, 54.

According to this embodiment, the floating seal apparatus 53 having more excellent seizure resistance and wear resistance can be provided. It is preferable to perform a sealing treatment with a infiltrated resin on a thermal spray membrane contact material, to prevent invasion of water and the like through pores having air permeability in a thermal spray membrane. In view of conventional seal rings constituted of a high Cr cast iron material, the above-mentioned metal phase or alloy phase containing one or more elements selected from the group consisting of Ni, Cr, Cu, Co and Fe is required to have corrosion resistance and have high hardness (Hv: 700 or more). Therefore, the above-mentioned metal phase or alloy phase containing one or more elements selected from the group consisting of Ni, Cr, Cu, Co and Fe is preferably, for example, a Ni—Cr-base alloy prepared by alloying one or more elements selected from the group consisting of Cr, Al, Si and Mo or a Fe-based alloy prepared by alloying one or more elements selected from the group consisting of Cr, Ni, Al and Si.

Fourth Embodiment

Figure 8:
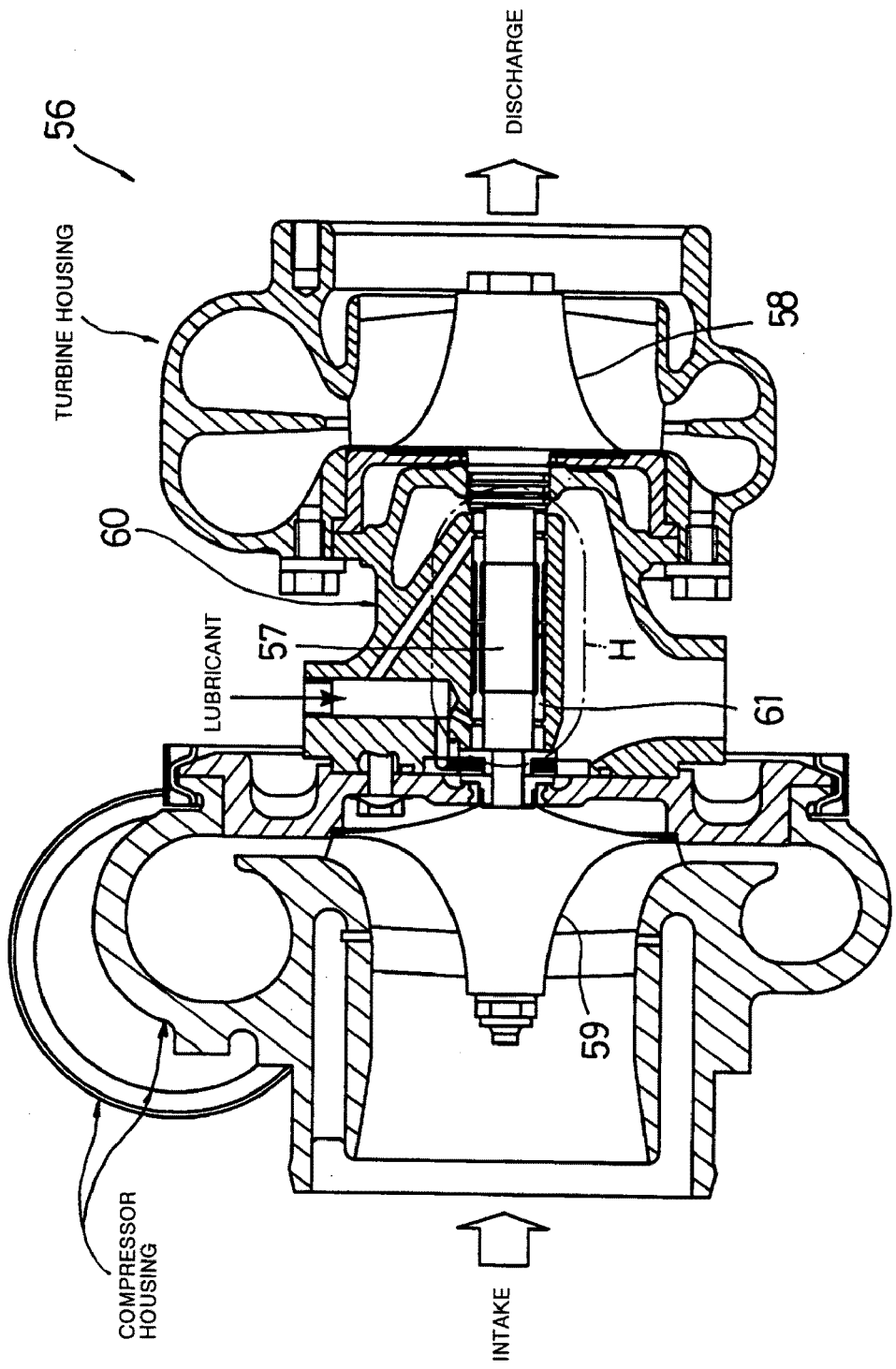
FIG. 8 is a schematic structure explanation view of a turbo charger apparatus according to a fourth embodiment of the present invention.

FIG. 8 shows a schematic structure explanation view of a turbo charger apparatus according to a fourth embodiment of the present invention.

A turbo charger apparatus 56 according to this embodiment comprises, mainly, a turbine shaft 57, a turbine wheel 58 and a compressor wheel 59 connected by this turbine shaft 57, and floating bushing 61 inserted between the turbine shaft 57 and a bearing surface formed on a center housing (supporting body) 60. By rotating the turbine wheel 58 utilizing an exhaust gas from an engine the illustration of which is not shown, the compressor wheel 59 placed coaxially with the turbine wheel 58 is rotation-operated, and a large amount of air is fed into a combustion chamber of the engine from the compressor wheel 59.

Figure 9:
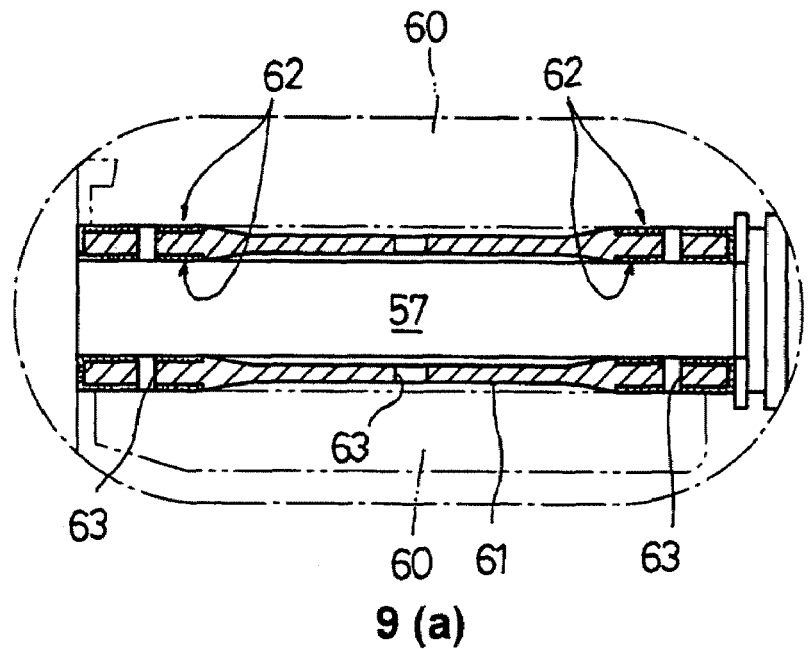
FIGS. 9 (a), (b) are enlarged views of an H portion in FIG. 8.
Figure 9:
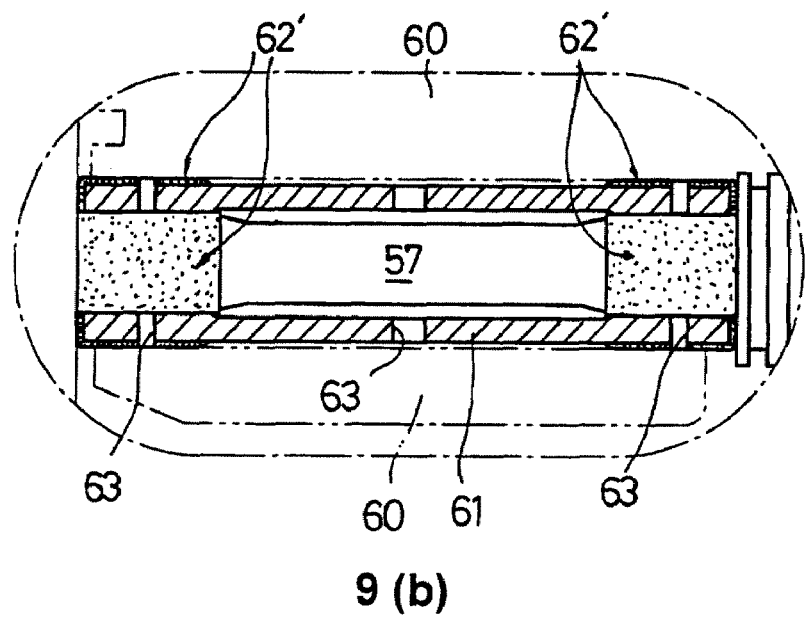

According to this embodiment, a thermal spray membrane contact material 62 according to any of Nos. 1 to 16 in Table 1 is film-formed on the outer circumferential surface of a floating bushing 61 in sliding-contact with a bearing surface formed on the center housing 60 and the inner circumferential surface of a floating bushing 61 in sliding-contact with the turbine shaft 57, as shown in FIG. 9 (a). That represented by a numeral 63 is an oil feeding pore.

According to this embodiment, since the thermal spray membrane contact material 62 according to any of Nos. 1 to 16 in Table 1 is film-formed on the outer circumferential surface of the floating bushing 61 in sliding-contact with a bearing surface formed on the center housing 60 and the inner circumferential surface of the floating bushing 61 in sliding-contact with the turbine shaft 57, the turbo charger apparatus 56 excellent in seizure resistance and wear resistance can be obtained. Additionally, there is a merit that decrease in a lubricating ability caused by lack of Pb and accumulation of CuS and a problem of environmental deterioration, which are problems in conventional floating bushings containing Pb, are not caused.

In the turbo charger apparatus 56 according to this embodiment, clearance between the turbine shaft 57 and the floating bushing 61 and clearance between the floating bushing 61 and the center housing 60 are each strictly managed, to ensure fluid lubricity with a lubricating oil in rotation at high speed, therefore, to prevent large change in clearance amount between the floating bushing 61 and the turbine shaft 57 generally made of steel and the center housing 60 made of cast iron due to difference in thermal expansion leads to prevention of problems such as seizure by increase in sliding resistance, and the like. Therefore, the base material of the floating bushing 61 in the present invention is preferably a steel, cast iron or Fe-based sintered material having a thermal expansion coefficient of 1.1 to $1.5 \times 10^{-5}$ also from the economical standpoint. To thus adopt a porous Fe-base alloy-based sintered material capable of containing a lubricating oil as the base material of the floating bushing 61 has a merit that adhesion under initial operating condition in which a lubricating oil cannot be sufficiently fed can be surely prevented.

When it is difficult to film-form the above-mentioned thermal spray membrane contact material 62 on the inner circumferential surface of the floating bushing 61, it is advantageous that a thermal spray membrane contact material 62' according to any of Nos. 1 to 16 in Table 1 is film-formed on the outer circumferential surface of the floating bushing 61 in sliding-contact with a bearing surface formed on the center housing 60 and the outer circumferential surface of the turbine shaft 57 in sliding-contact with the inner circumferential surface of the floating bushing 61, as shown in FIG. 9 (b). Also by this constitution, the same action and effect as those in the above-mentioned embodiment can be obtained.

Fifth Embodiment

Figure 10:
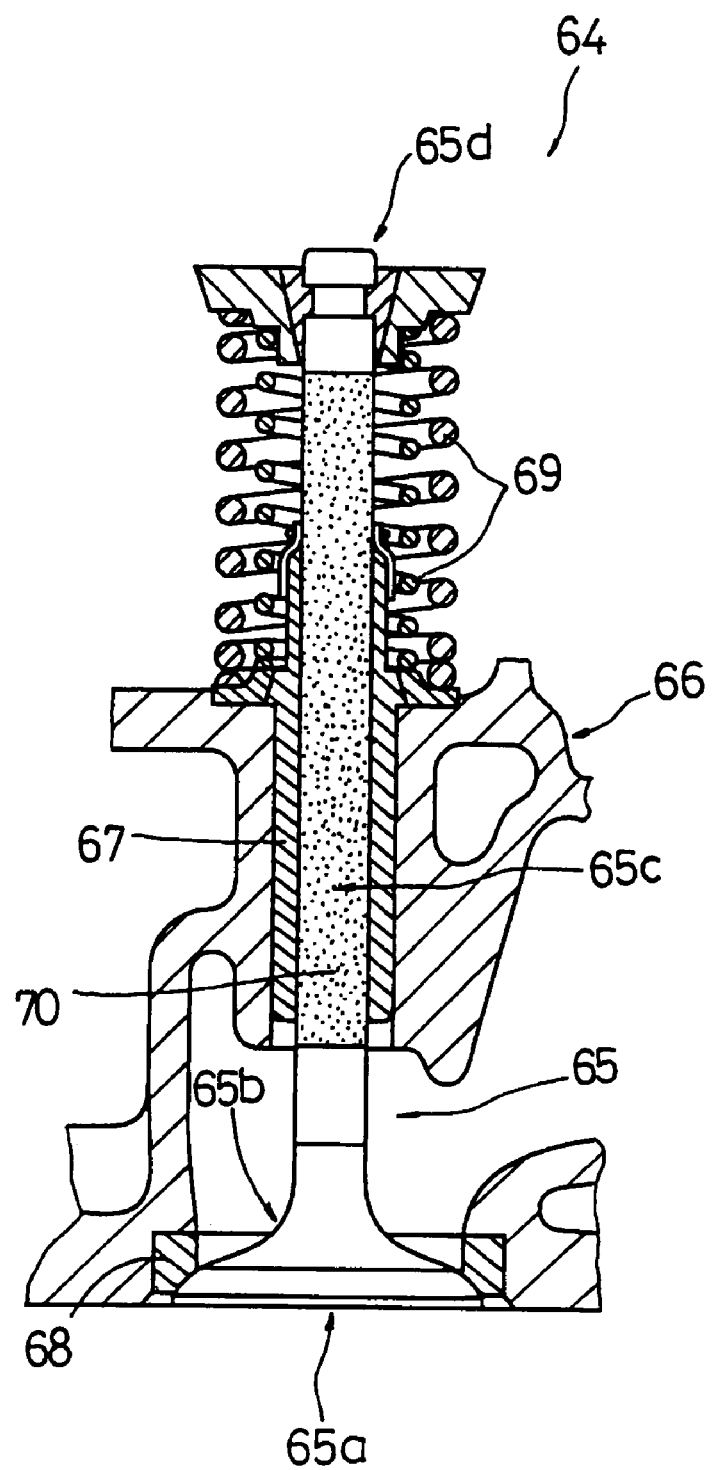
FIG. 10 is a schematic structure explanation view of an engine valve apparatus according to a fifth embodiment of the present invention.

FIG. 10 is a schematic structure explanation view of an engine valve apparatus according to a fifth embodiment of the present invention.

An engine valve apparatus 64 according to this embodiment comprises a valve 65 opening and closing a combustion chamber of an engine the illustration of which is not shown and a valve guide 67 installed at a desired site of a cylinder head 66 for guiding the motion of the valve 65, additionally, a valve sheet 68 and valve spring 69, and a rocker arm, cam shaft, cam shaft timing gear, timing belt, crank shaft timing gear and the like all illustrations of which are not shown.

The above-mentioned valve 65 has a valve head 65a, valve face 65b, valve stem 65c and valve stem end 65d. In this valve, a thermal spray membrane contact material 70 according to any of Nos. 1 to 16 in Table 1 is film-formed on the surface of the valve stem 65c in sliding-contact with the above-mentioned valve guide 67.

According to this embodiment, it is of course possible to obtain an engine valve apparatus 64 excellent in seizure resistance and wear resistance, and additionally, Pb added conventionally in large amount into the base material of the valve guide 67 can be decreased or deleted.

Sixth Embodiment

Figure 11:
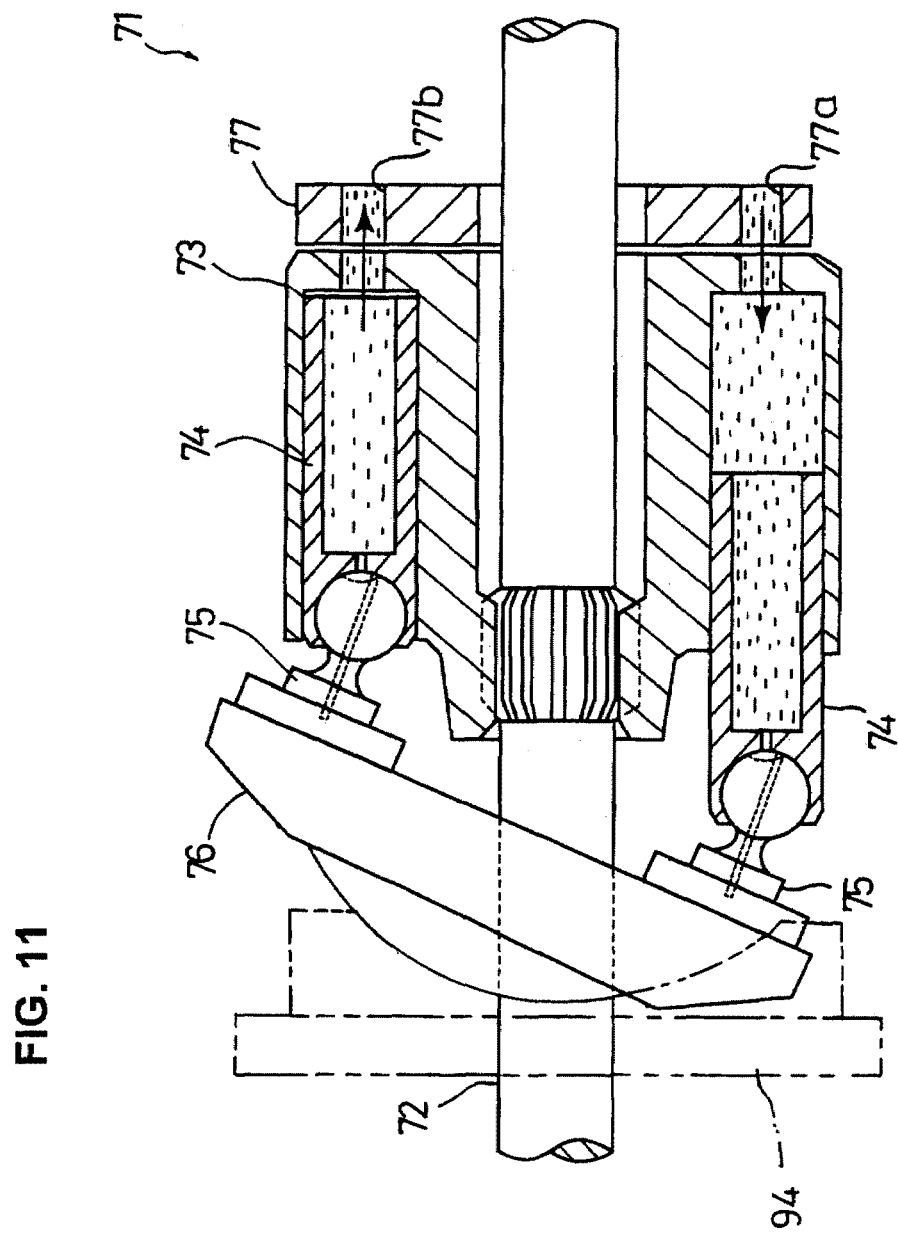
FIG. 11 is a main part structure explanation view of an inclined plate mode hydraulic piston pump according to a sixth embodiment of the present invention.

FIG. 11 is a main part structure explanation view of an inclined plate mode hydraulic piston pump according to a sixth embodiment of the present invention.

In an inclined plate mode hydraulic piston pump 71 according to this embodiment, a drive shaft 72 and a cylinder block 73 are placed co-axially, and a piston shoe 75 having a spherical head portion engaged into one end of a piston 74 rotating with the cylinder block 73 is allowed to slide in contact with a rocker cam 76 placed inclined to the drive shaft 72 to cause reciprocation of the piston 74 in the cylinder block 73, and by this motion, the pressure of an oil sucked through a suction port 77a of a valve plate 77 is increased to cause discharge thereof through a discharge port 77b of the valve plate 77. Inclination of the rocker cam 76 is changed by ration along a contact surface with a cradle 94, and it is used for regulation of the discharge amount of the oil.

Here, essential for increase in the output of this inclined plate mode hydraulic piston pump 71 are increase in the oil pressure and increase in the flow rate, and it is important to increase the discharge amount of a high pressure oil by improvement of a sliding property between the piston shoe 75 and the rocker cam 76 and by increase in the inclination angle of the rocker cam 76 and the piston 74. Therefore, in the present embodiment, a thermal spray membrane contact material 78 according to any of Nos. 1 to 16 in Table 1 is film-formed on the contact surface of the piston shoe 75 represented by H in each of FIGS. 12 (a), (b). By this, increase in the output of the inclined plate mode hydraulic piston pump 71 becomes possible. That shown by a numeral 75a (79a) is an oil feeding route, and that shown by a numeral 75b (79b) is an oil lubricant groove.

Figure 12:
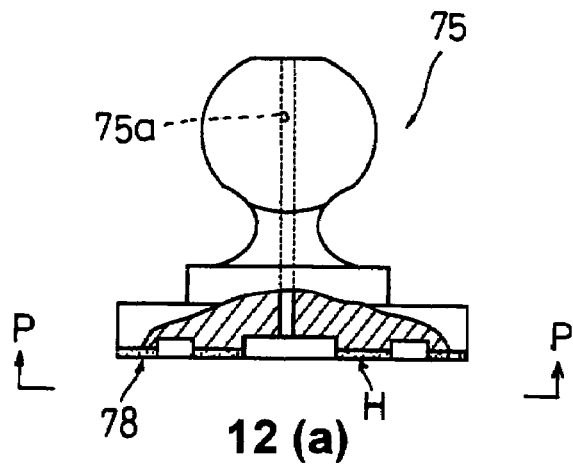
FIG. 12 shows a side elevation view (a) displaying a piston shoe having a partially broken-out section, a view (b) taken along line P-P of FIG. 12 (a), and a side elevation view (c) displaying a piston shoe according to another embodiment partially exploded.
Figure 12:
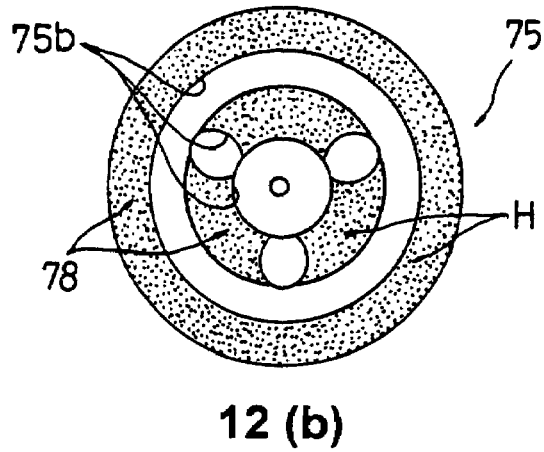
Figure 12:
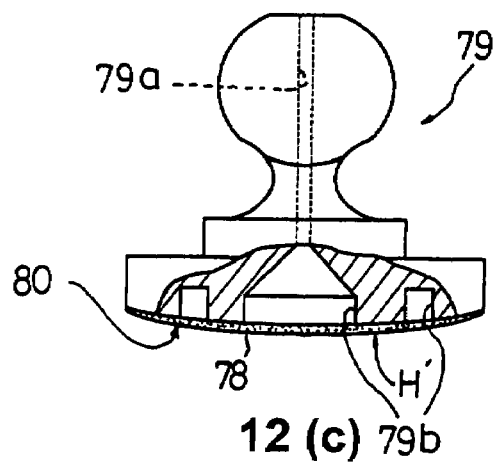

Also in the case of a radial mode hydraulic piston pump (illustration not shown) of different mode from the inclined plate mode hydraulic piston pump 71 of this embodiment, the output of the radial mode hydraulic piston pump can be increased by film-forming a thermal spray membrane contact material 80 according to any of Nos. 1 to 16 in Table 1 like in this embodiment on a contact surface H' of the piston shoe 79 (see, FIG. 12 (*c*)), on a contact surface of a cam ring (illustration not shown) which is a contact opposite of the piston shoe 79, or on a contact surface between a cylinder block and a pintle (both illustration not shown). Also in an inclined plate mode hydraulic piston motor and a radial mode hydraulic piston motor respectively having the same basic constitutions as the inclined plate mode hydraulic piston pump 71 and radial mode hydraulic piston pump according to the embodiments, the same action and effect as those of the embodiments can be obtained according to the characteristic of the present invention, though detailed descriptions thereof by illustration are not shown.

Seventh Embodiment

Figure 13:
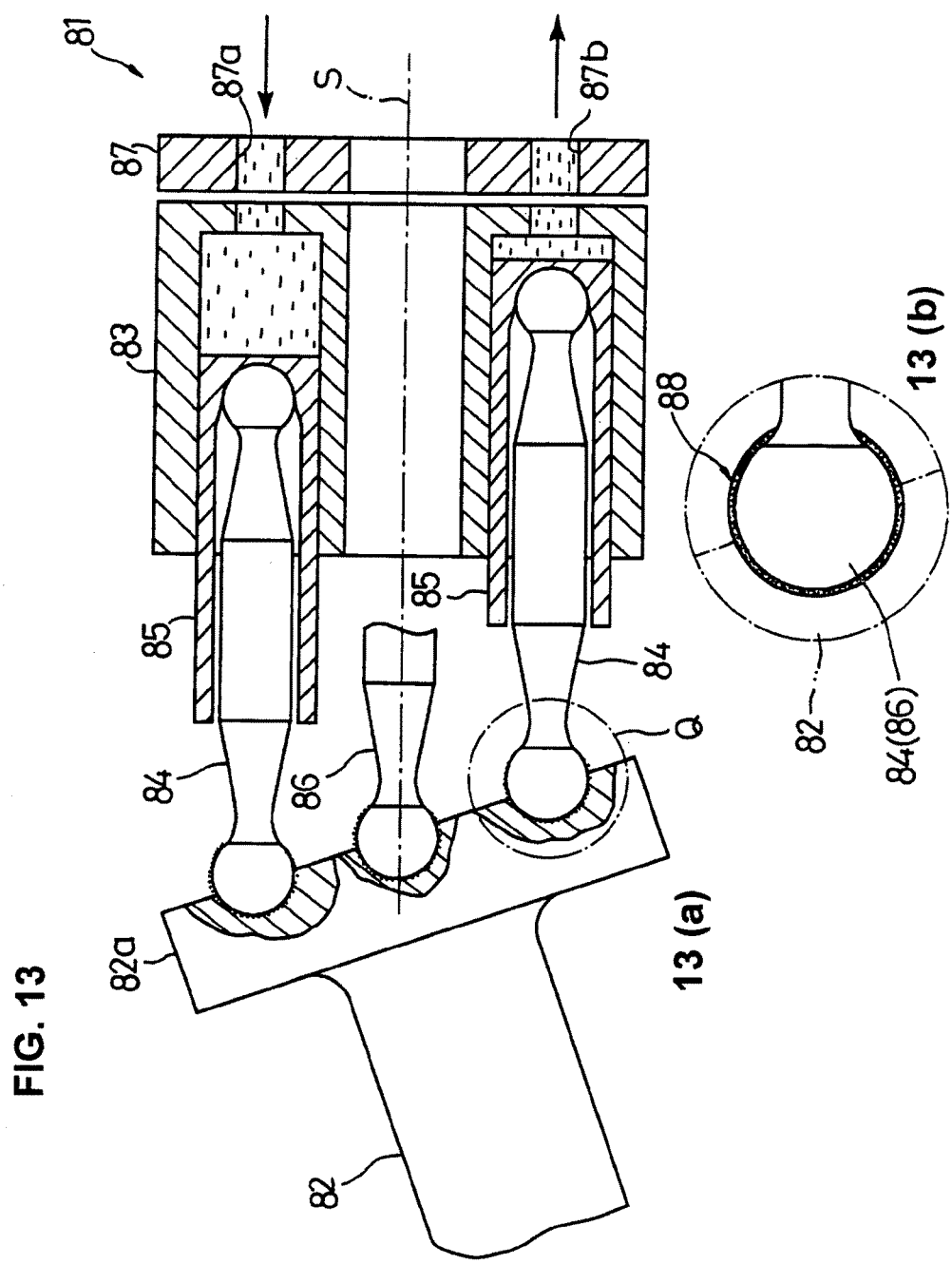
FIG. 13 shows a main part structure explanation view (a) of an inclined axis mode hydraulic piston pump according to a seventh embodiment of the present invention and a Q portion-enlarged view (b) in (a).

FIG. 13 shows a main part structure explanation view (a) of an inclined axis mode hydraulic piston pump according to a seventh embodiment of the present invention and a Q portion-enlarged view (b) in (a).

In an inclined axis mode hydraulic piston pump 81 according to this embodiment, a cylinder block 83 is placed inclined to a drive shaft 82, and by driving of the drive shaft 82, the cylinder block 83 is allowed to rotate around the shaft center S of a center shaft 86 through a piston rod 84 having at one end a spherical head portion engaged into a spherical recess formed on the end portion 82*a* in the form of disk of the drive shaft 82, and a piston 85 engaged with the piston rod 84, to cause reciprocation of the piston 85 in the cylinder block 83, and by this, the pressure of an oil sucked through a suction port 87*a* of a valve plate 87 is increased to cause discharge thereof through a discharge port 87*b* of the valve plate 87.

The sliding speed at the spherical site of the spherical head portion of the above-mentioned piston rod 84 and center shaft 86 is as extremely low as 0.1 m/sec or less, and the lubrication condition at the contact surface tends to be boundary lubrication, there is conventionally a problem of tendency of generation of noise. Therefore, in this embodiment, a thermal spray membrane contact material 88 according to any of Nos. 1 to 16 in Table 1 is film-formed on the spherical site of the spherical head portion of the piston rod 84 and center shaft 86 (see, FIG. 13 (*b*)). With this arrangement, it becomes possible to previously prevent generation of noise which is a conventional problem. Generation of noise can be previously prevented like in this embodiment also by film-forming the above-mentioned thermal spray membrane contact material 88 on the spherical site of the spherical recess of the end portion 82*a* in the form of disk of the drive shaft 82.

Eighth Embodiment

Figure 14:
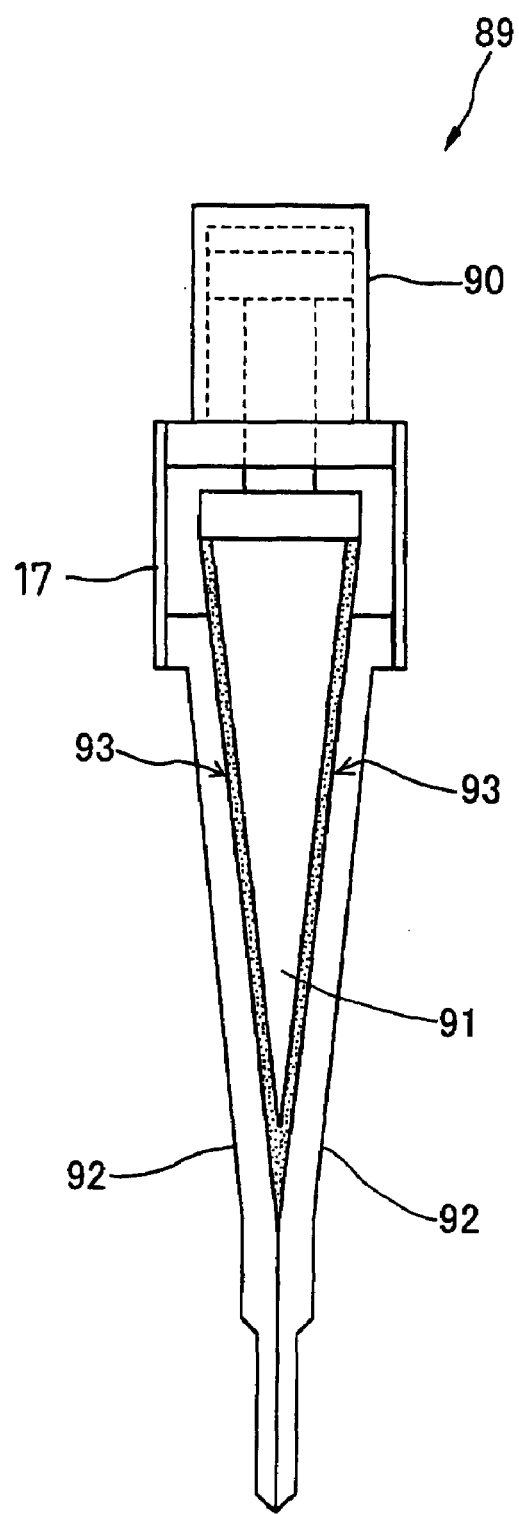
FIG. 14 is a schematic structure explanation view of a rock mass crushing wedge apparatus according to an eighth embodiment of the present invention.

FIG. 14 is a schematic structure explanation view of a rock mass crushing wedge apparatus according to an eighth embodiment of the present invention.

A rock mass crushing wedge apparatus 89 according to this embodiment comprises a wedge 91 receiving a thrust from a hydraulic cylinder 90 (thrust generating means) and a pair of wedge guides 92 so placed as to sandwich this wedge 91. By allowing the wedge 91 to slide against the wedge guides 92 by driving of the hydraulic cylinder 90, the thrust from the hydraulic cylinder 90 is converted into transverse direction width expanding force by the wedge guides 92, and a rock mass is broken by this transverse direction width expanding force to effect a rock splitting operation.

In the rock mass crushing wedge apparatus 89 thus constituted, a thermal spray membrane contact material 93 according to any of Nos. 1 to 16 in Table 1 is film-formed on the contact surface of the wedge 91 (it may also be wedge guides 92). By this, larger rock splitting force can be obtained, and running cost can be remarkably reduced.

Next, specific examples of the present invention will be illustrated referring to drawings.

Example 1

Bearing Test 1

Evaluation of Various Hard Membrane of Multi-Layer Bearing Axis

Figure 15:
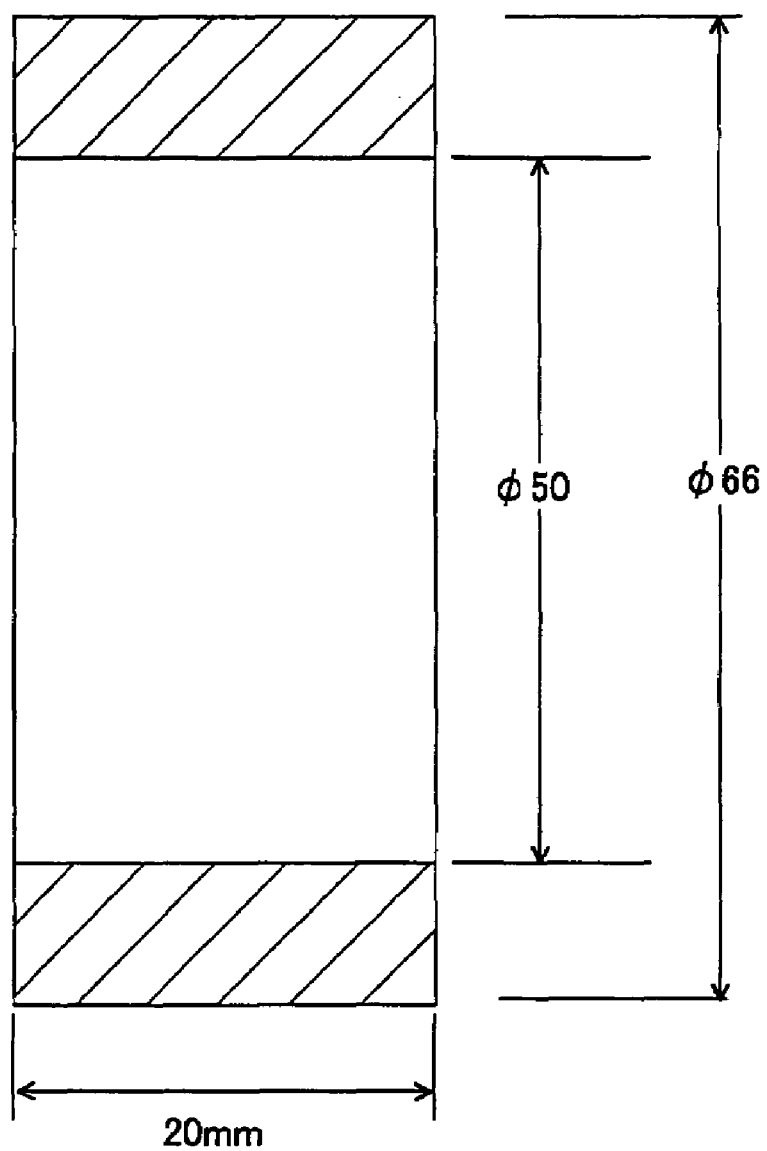
FIG. 15 is a view showing the shape of a bearing bushing for bearing test.
Figure 16:
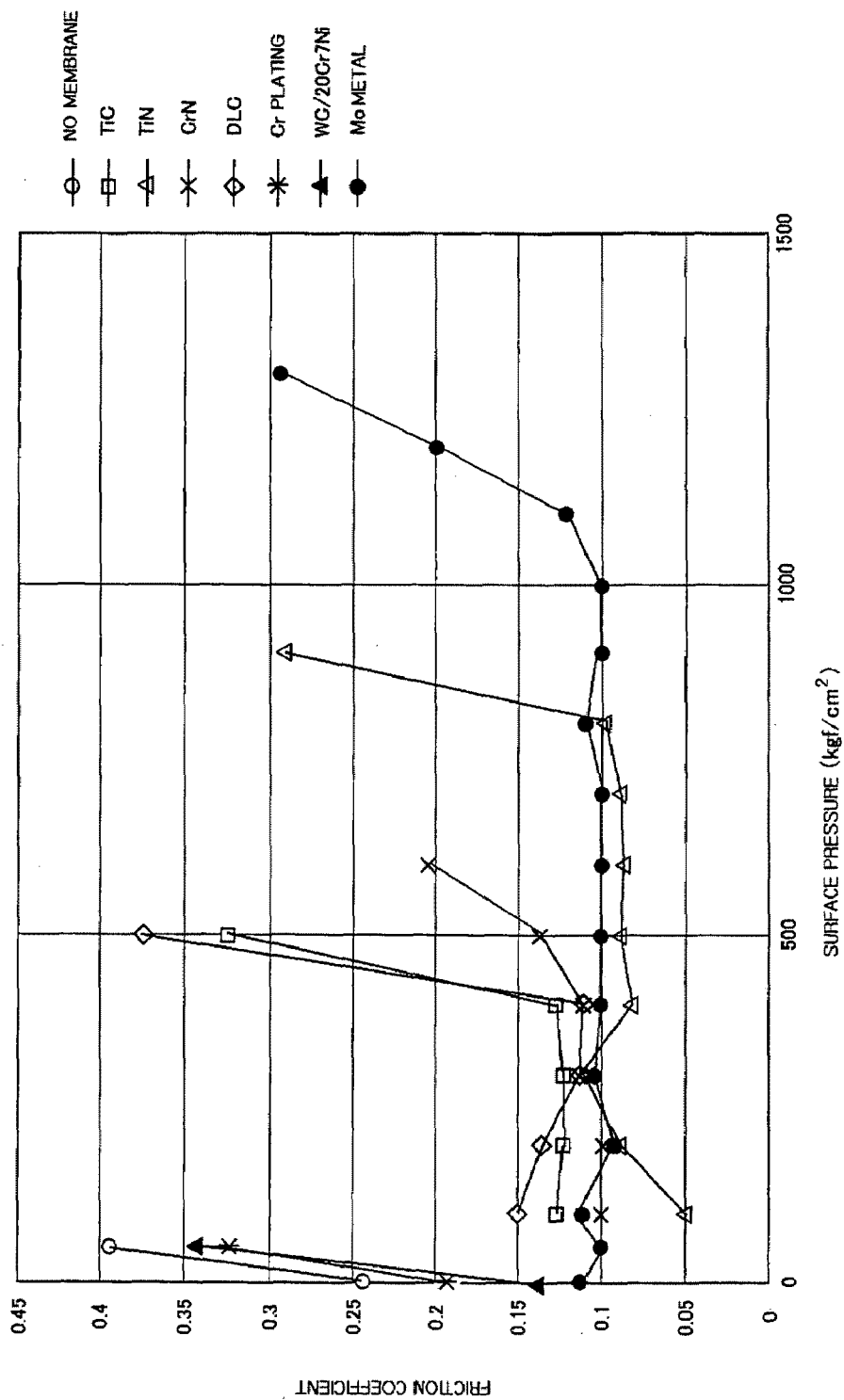
FIG. 16 is a view showing evaluation of adhesion resistance of various materials.

In this example, a bearing test was conducted between various multi-layer bearing axes obtained by performing induction hardening and tempering (180° C.×1 hr, surface hardness: HRC 60) on the outer circumferential surface of a S55C bearing axis, and the bearing bushing (S45C ingot material) shown in FIG. 15, to check seizure resistant limit surface pressure of the various hard membrane materials. The above-mentioned various hard membranes are in total seven materials of TiC, TiN, CrN, DLC (diamond like carbon), Cr plating, WC20Cr7Ni and Mo metal. On the inner circumferential surface (contact surface) of the bearing bushing, an induction hardening and tempering (160° C.×1 hr) treatment was performed, and the hardness of the inner circumferential surface was controlled to Hv600 (HRC 55). In this bearing test, various multi-layer bearing axes were swung at an average slipping speed of 0.55 m/min at a high swinging angle (160°), hypothesizing conditions extremely deteriorating lubricity, and the lubrication condition is only painting of commercially available Li grease at the initiation. The surface pressure was increased by 25 kgf/cm$^2$ every 2000 times swinging at the given surface pressure of the various multiple-layer bearing axes, and the surface pressure before the friction coefficient exceeded 0.3 was evaluated as the limit seizure resistant surface pressure. The results are shown in FIG. 16. As apparent from FIG. 16, a Mo metal is most excellent as an adhesion resistant substance, subsequently, nitrides of TiN and CrN are excellent, and next to this, TiC is excellent as an adhesion resistant substance.

Further, tests of the same object as for the above-mentioned bearing test were conducted, in which various multiple-layer bearing axes obtained by forming a Zn phosphate formation membrane, Mn phosphate formation membrane, Cr plating membrane, Zn thermal spray membrane, Zn-20 wt % Al-1 wt % Cu-0.3 wt % Mg thermal spray membrane, WC-20 wt % Cr 7 wt % Ni plasma thermal spray membrane and Mo metal (99% Mo) plasma thermal spray membrane, respectively, on the above-mentioned bearing axes (surface hardness: HRC 55) were used instead of the above-mentioned various multiple-layer bearing axes, and a bearing bushing made of a normalized material of about HRC 25 on the inner circumferential surface of which an induction hardening and tempering treatment had not been conducted was used instead of the above-mentioned bearing bushing (S45C, inner circumferential surface hardness: HRC 55), further, each swinging angle was changed to 10° and the average slipping speed was changed to 0.05 m/min. The results are shown in FIG. 17.

Figure 17:
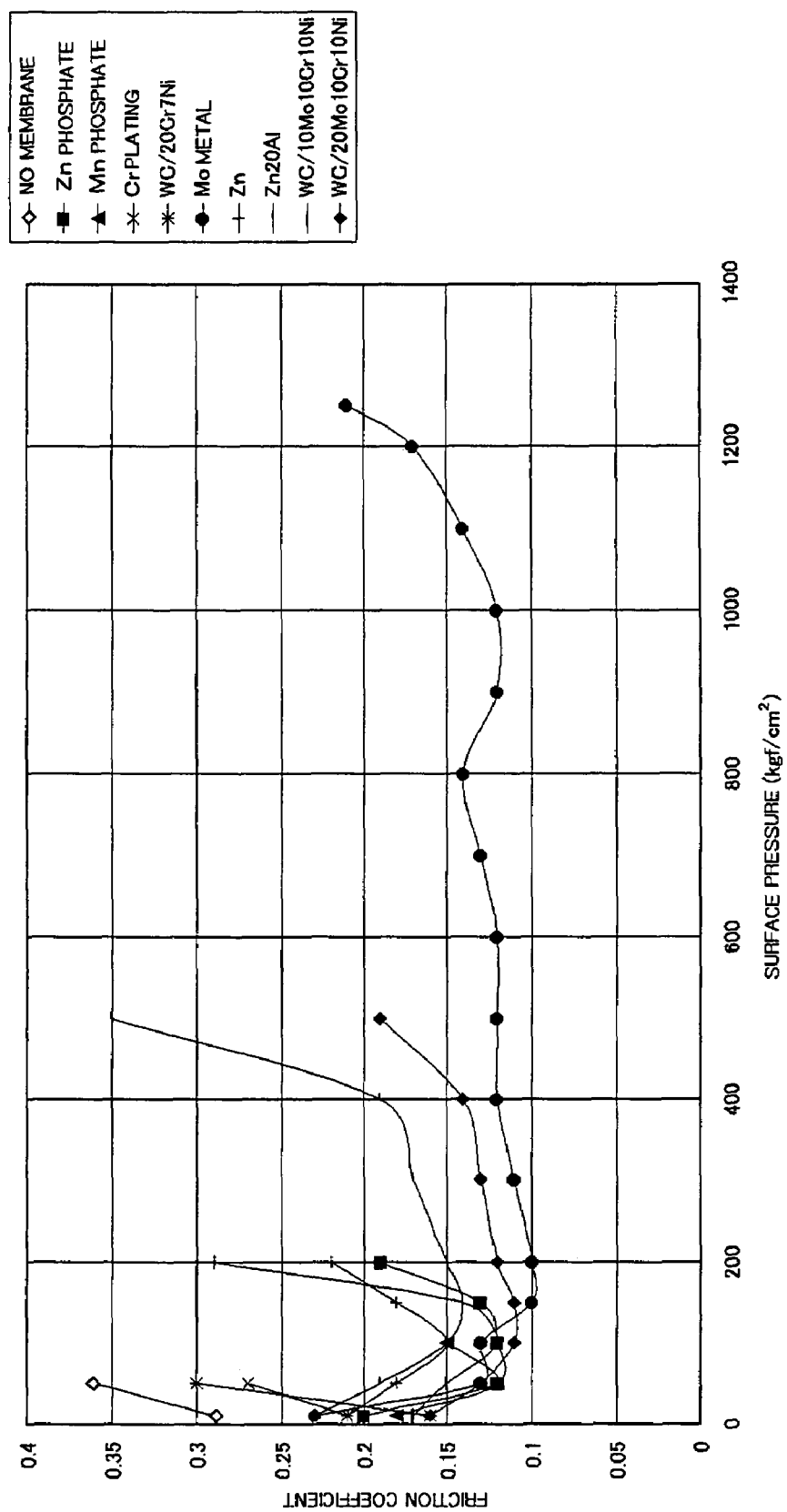
FIG. 17 is a view showing seizure resistant limit surface pressure of various membranes.

As apparent from the FIG. 17, seizing is observed in Mn phosphate membrane, Cr plating, and WC-20Cr7Ni thermal spray membrane (Hv: about 850) under a surface pressure of 100 kgf/cm$^2$. Even in WC-20Cr7Ni that contains 45 vol % of WC, which is said to be excellent in cohesion resistance, did not show the cohesion resistance as expected. There is a possibility that this is ascribable to a problem that lubricity is not ensured only with greasing at the initial period, however, this is further ascribable to poor self lubricity of WC. In contrast, the Mo thermal spray membrane does not cause seizure until about 1250 kgf/cm² while maintaining extremely low friction coefficient. Though being a hard material having a Hv of 550 to 750, the Mo thermal spray membrane scarcely attack a bearing bushing material (S45C normalized material) as a contact opposite. It was found that the reason for this is that 1) Mo itself is extremely excellent in self lubricity though pores of about 5 vol % are contained in a membrane, and as a result of chemical analysis of its thermal spray membrane, that 2) a Mo oxide working as a solid lubricant is dispersed in large amount (oxygen: 0.93 wt %). The cohesion resistance of a cemented thermal spray membrane can be improved by dispersing a Mo metal phase in a WC-10Cr10Ni cemented thermal spray membrane in which 10 or 20 wt % of Mo metal phase has been dispersed, and this cemented thermal spray membrane is suitably film-formed on a contact surface of the above-mentioned thrust bearing and floating seal.

Since the Mo metal thermal spray membrane is hard as described above, it is also excellent in resistance against wearing by invasion of earth and sand onto a contact surface, and an extremely excellent connecting apparatus can be produced by combining a multi-layer bearing axis on which a Mo metal thermal spray membrane is formed with a bearing bushing made of an oil contained iron-based porous sintered material containing in its structure cheap martensite (see, the second embodiment of the present invention). From the results of the above-mentioned bearing test (see, FIG. 16), it is found that a multi-layer bearing axis on which a nitride membrane is formed is also preferable, however, its seizure resistance is lower as compared with a Mo thermal spray membrane and the thickness of its membrane cannot exceed several μm, thus it is expected that long wearing life cannot be obtained when earth and sand invade. Therefore, an embodiment combining a multi-layer bearing axis on which a nitride membrane is formed with a cheap porous oil-containing sintered bearing is also preferable. Furthermore, an excellent seizure resistance-improving effect can be obtained also by a Zn or Zn-base alloy thermal spray membrane.

Example 2

Bearing Test 2

Investigation of Alloy Phase in Thermal Spray Membrane

In this example, Cu-10Sn, Cu-30Zn, Cu-63Zn, Fe-0.6C-7Al-22Cu alloy and Fe20Ni10Al alloy powder were compounded in amounts of 95, 90, 80, 70, 50, 20 and 5 wt %, in addition to Cu and Ni metals, into Mo metal to prepare a thermal spray mixed powder which was thermal-sprayed on the same bearing axis as in Example 1 to form a thermal spray membrane having a thickness of 0.2 mm. Various multi-layer bearing axes were thus obtained of which surface roughness had been controlled to 3 μm or less. 0.7 wt % of a graphite powder (average particle size: 6 μm, Ronza KS6) was mixed with a 4600 iron powder of #100 mesh or less to obtain a mixed powder, to this was added and mixed an organic lubricant (Acrawax) in an amount of 0.7 wt % and the mixture was molded under a molding pressure of 5 ton/cm², then, subjected to vacuum sintering at 1150° C. for 2 hours, quenching with N₂ gas, and a tempering treatment at 200° C. for 1 hour, further, an oil-adding treatment, then, subjected to mechanical processing to obtain a bearing bushing having the same shape as that of the bearing bushing shown in FIG. 15. The surface roughness of the inner circumferential surface of the bearing bushing was finished to about 3 μm by turning on a lathe. The oil-containing lubricant composition is a lubricant composition containing 5 wt % of micro crystalline wax and automobile gear lubricating lubricant (75W/90, S addition amount in extreme-pressure additive: 0.8 wt %), and the oil-adding treatment was conducted by infiltrating the sintered body in a lubricant composition which had been liquefied by heating at 120° C. under reduced pressure. On the other hand, the sliding conditions were the same as those in the Mo metal thermal spray membrane treatment in Example 1 (each swinging angle: 10°, average slipping speed: 0.05 m/min).

Figure 18:
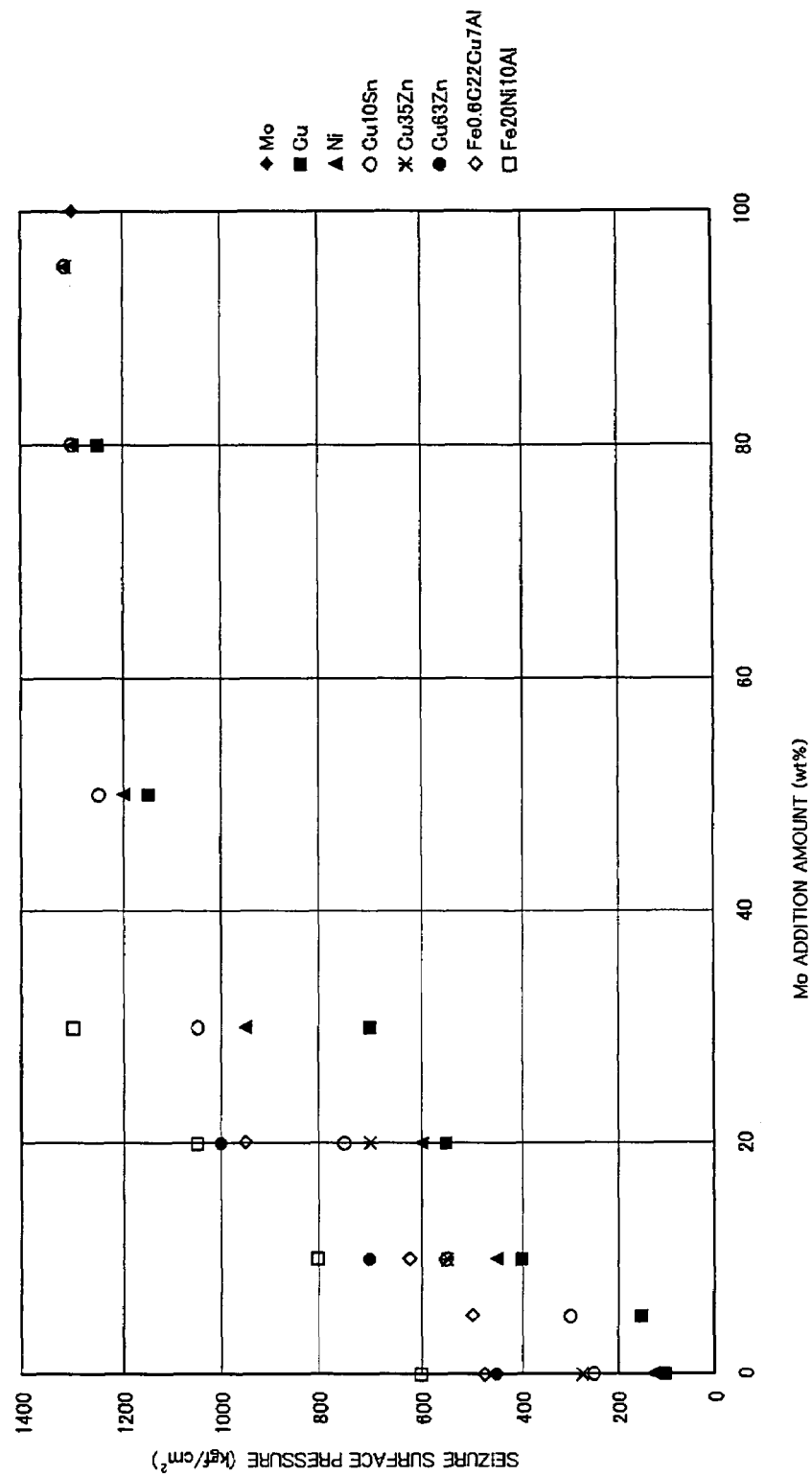
FIG. 18 is a view showing a correlation between the addition amount of Mo metal phase and the seizure resistant limit surface pressure.

FIG. 18 shows the results of the bearing test of the above-mentioned embodiment, and as apparent from these results, the limit seizing surface pressure starts to be sharply improved at 10 wt % or more of the Mo metal addition amount, and about 50 wt % Mo, its improvement effect starts to be saturated, and approximates the excellent limit seizing surface pressure of Mo metal. A more excellent contact material is obtained by selecting contact material-based alloy phases such as Cu—Sn-based, Cu—Zn-based alloys and the like, as compared with Cu, Ni, further, it was found that a more excellent contact material is obtained by selecting a Fe20Ni10Al-based alloy. However, this is ascribable to remarkable hardening due to two layer separation and precipitation of a Fe₃Al or FeAl ordered phase as disclosed in JP-A No. 9-49006 and JP-A No. 2002-180216 which are prior applications of the applicant, respectively. In this example, the seizure limit is not reached even under 1300 kgf/cm² when its limit seizure surface pressure is compared with that of the Mo metal thermal spray membrane (see, FIG. 17) according to Example 1, and reasons for this are that 1) a bearing bushing is constituted of an iron-based sintered material of low Young's modulus, and that 2) lubricity on a contact surface is further enhanced by this.

Example 3

Constant Speed Friction Wearing Test

Figure 19:
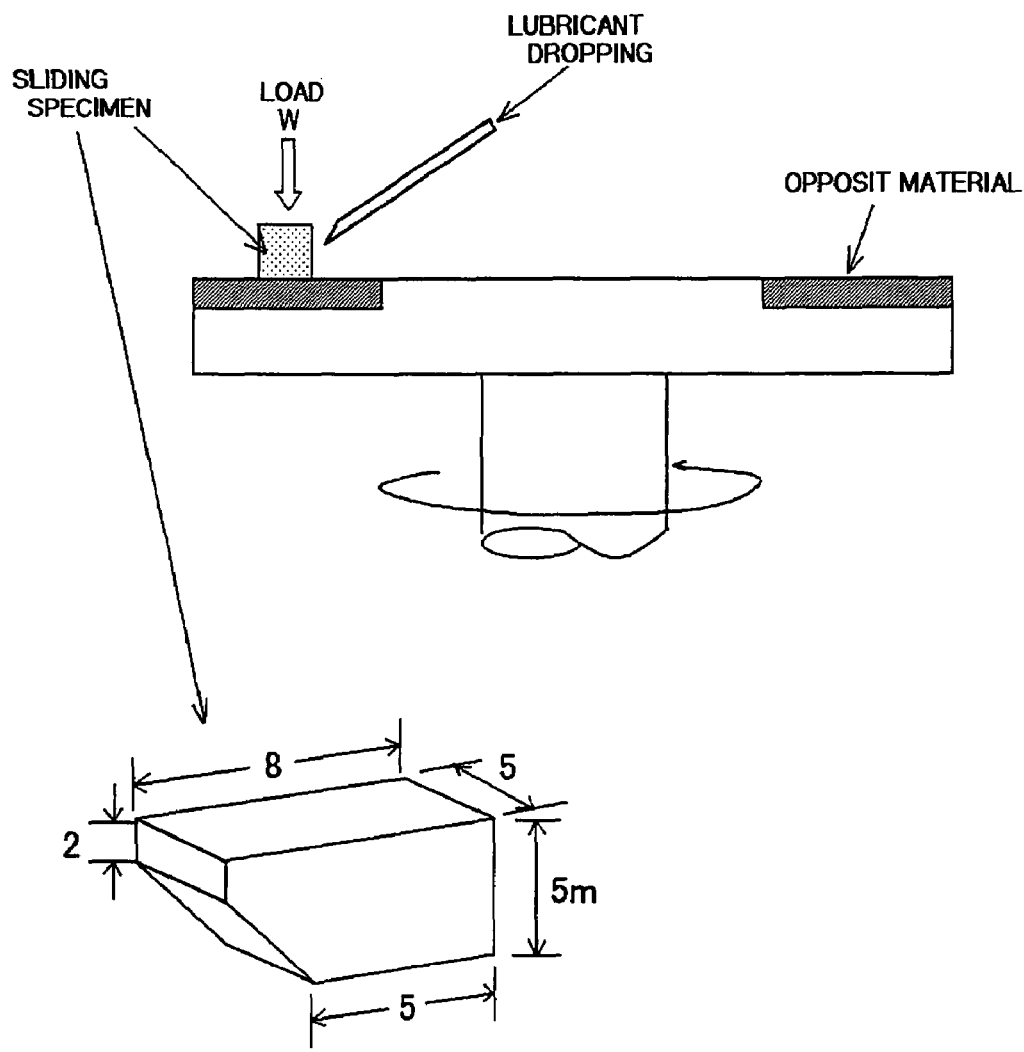
FIG. 19 is a view explaining constant speed friction and wearing test conditions and specimen shape.

In this example, the various thermal spray membrane materials handled in Example 2 in which the amount of the Mo metal phase was 3, 5, 10, 20, 30, 40 and 100 wt % in a Cu-10Sn alloy were thermal-sprayed on a contact surface of a specimen shown in FIG. 19, and the seizure resistance of the various thermal spray membrane materials was checked under a dropping lubrication condition by a constant friction wearing tester. Regarding the sliding test conditions, a carburization quenching and tempering treatment was performed on SCM415, and the surface hardness was controlled to HRC 60 and the surface roughness was controlled to 3 μm or less. Thus prepared rotation disc was rotated at a circumferential speed of 10 m/sec, while #10 engine oil heated at 60° C. was dropped at a rate of 5 cm³/min on the front surface of the sliding specimen to lubricate this. During this procedure, the friction coefficient and the worn amount at this moment were measured. In the case of no abnormality during 5 minutes under given surface pressure, an operation of increasing the surface pressure at a unit of 25 kgf/cm² was repeated, and the limit seizure resistant surface pressure or abnormal wearing generation limit surface pressure was checked. As comparative materials, a lead bronze ingot contact material (LBC4) and special high tensile brass (P31C) were used.

Figure 20:
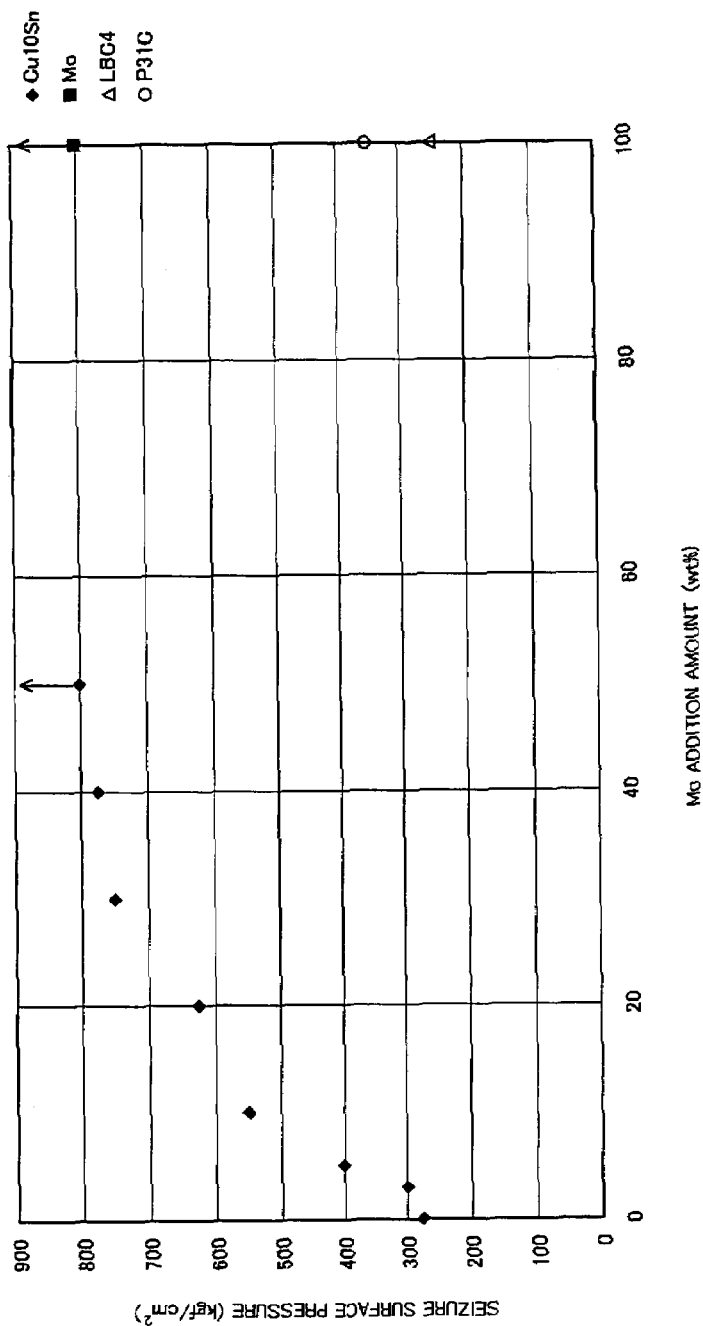
FIG. 20 is a view showing a correlation between the addition amount of Mo metal phase and the seizure resistant limit surface pressure.
Figure 21:
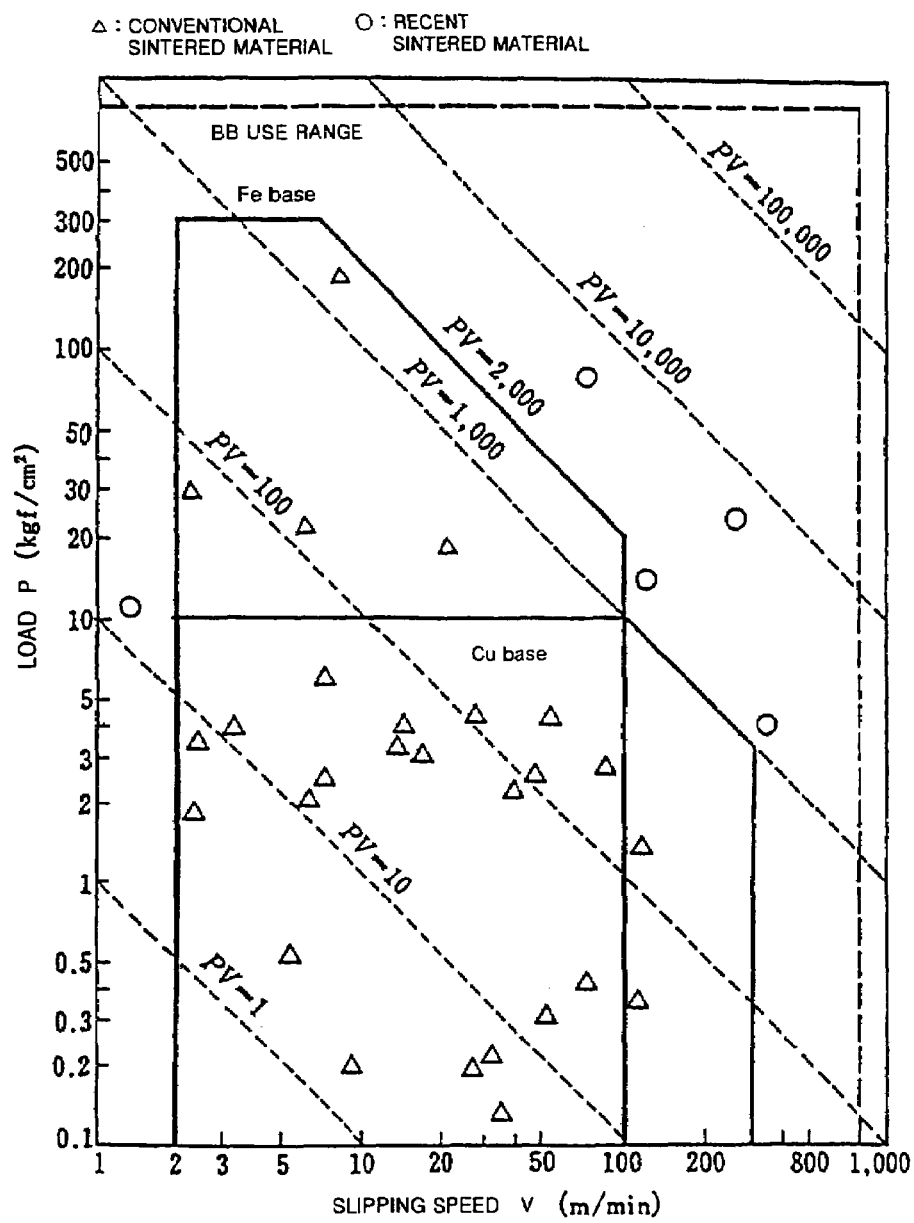
FIG. 21 is a view showing an application example of a conventional sintered bearing.

As apparent from FIG. 20 showing the results of this constant speed friction wearing test, the limit seizing surface pressure is sharply improved with an addition amount of 5 wt % Mo or more, and the lower limit of the Mo metal phase is 5 wt %, more preferably 10 wt %, and at a Mo amount of 50 wt %, its improvement effect is saturated and the surface pressure approximates the excellent limit seizing surface pressure of Mo metal, and the Mo upper limit addition amount is preferably 50 wt % from the economical standpoint.

What is claimed is:

1. A connecting apparatus comprising a first machine constituent element on a first side connected to a second machine constituent element on a second side placed via a supporting axis supported by the first machine constituent element on the first side and a bearing bushing outer-engaged on the supporting axis so that the first machine constituent element and the second machine constituent element are mutually revolvable or rotatable, wherein said supporting axis is made of a contact member in which a contact surface of a contact part base material of an apparatus having a rotation contact mechanism and/or a linear contact mechanism is formed of a thermal spray membrane contact material comprising a Mo metal phase, or 5 vol % or more of a Mo metal phase and another metal phase containing one or more elements selected from the group consisting of Fe, Ni, Co, Cr, Cu, Zn and alloys thereof, as a constituent material, and said bearing bushing is constituted of a sintered material of a Fe—C-based alloy, a Fe—C—Cu-based alloy or a Cu—Sn-based alloy, said sintered material having a content of pores of 5 to 30 vol %, in which the pores are filled with a lubricating oil or a lubricant composition, or is constituted of a sintered material of a Fe—C-based alloy, a Fe—C—Cu-based alloy or a Cu—Sn-based alloy, said sintered material having a content of pores of 5 to 30 vol %, in which the pores are filled with a lubricating oil or a lubricant composition, and a solid lubricant is dispersed therein.

2. The connecting apparatus according to claim 1, wherein said bearing bushing is constituted of a porous Fe-based alloy-based sintered contact material containing at least 2 to 16 wt % of Al forming a $Fe_3Al$ ordered phase, and containing one or more elements selected from the group consisting of 10 to 40 wt % of Cu, 1.5 wt % or less of C, 20 wt % or less of Ni and 1.5 wt % or less of P.

3. The connecting apparatus according to claim 1, wherein said bearing bushing is constituted of a porous Cu-based alloy-based sintered contact material containing at least 2 to 10 wt % of Sn and 2 to 14 wt % of Al, and further containing a Cu—Al-based beta phase in its structure.

4. The connecting apparatus according to claim 1, used as a connecting means at a connecting site of any of a track link of a crawler type lower structure, a roller of a lower structure, an equalizer supporting the body of a bulldozer and a suspension apparatus of a dump truck, and the like.

5. A connecting apparatus comprising a first machine constituent element on a first side connected to a second machine constituent element on a second side placed via a supporting axis supported by the first machine constituent element on the first side and a bearing bushing outer-engaged on the supporting axis so that the first machine constituent element and the second machine constituent element are mutually revolvable or rotatable, and having a thrust bearing which bears and supports a thrust load acting between said first machine constituent element on the first side and said second machine constituent element on the second side, wherein said supporting axis is made of a contact member in which a contact surface of a contact part base material of an apparatus having a rotation contact mechanism and/or a linear contact mechanism is formed of a thermal spray membrane contact material comprising a Mo metal phase, or 5 vol % or more of a Mo metal phase and another metal phase containing one or more elements selected from the group consisting of Fe, Ni, Co, Cr, Cu, Zn and alloys thereof, as a constituent material, and said bearing bushing is constituted of a sintered material of a Fe—C-based alloy, a Fe—C—Cu-based alloy or a Cu—Sn-based alloy, said sintered material having a content of pores of 5 to 30 vol %, in which the pores are filled with a lubricating oil or lubricant composition, or is constituted of a sintered material of a Fe—C-based alloy, a Fe—C—Cu-based alloy or a Cu—Sn-based alloy, said sintered material having a content of pores of 5 to 30 vol %, in which the pores are filled with a lubricating oil or lubricant composition, and a solid lubricant is dispersed therein.

6. The connecting apparatus according to claim 5, wherein said bearing bushing is constituted of a porous Fe-based alloy-based sintered contact material containing at least 2 to 16 wt % of Al forming a $Fe_3Al$ ordered phase, and containing one or more elements selected from the group consisting of 10 to 40 wt % of Cu, 1.5 wt % or less of C, 20 wt % or less of Ni and 1.5 wt % or less of P.

7. The connecting apparatus according to claim 5, wherein said bearing bushing is constituted of a porous Cu-based alloy-based sintered contact material containing at least 2 to 10 wt % of Sn and 2 to 14 wt % of Al and further containing a Cu—Al-based beta phase in its structure.

8. The connecting apparatus according to claim 5, wherein a thermal spray membrane comprising at least 5 to 50 vol % of a Mo metal phase and 10 to 50 vol % of a carbide comprising at least one or more elements selected from the group consisting of W, Ti, Cr, Mo and V, and a metal phase or an alloy phase containing one or more elements selected from the group consisting of Ni, Cr, Cu and Co and the remainder being Fe, is formed on a contact surface of said thrust bearing.

9. The connecting apparatus according to claim 5, wherein the connecting apparatus is used as a connecting means at a connecting site of a track link of a crawler type lower structure, a roller of a lower structure, an equalizer supporting the body of a bulldozer or a suspension apparatus of a dump truck.

* * * * *